(12) United States Patent
Schulz et al.

(10) Patent No.: US 12,709,287 B2
(45) Date of Patent: Aug. 18, 2026

(54) CUSTOMIZABLE OPERATING MODES FOR VEHICLES

(71) Applicant: Scout Motors Inc., Tysons, VA (US)

(72) Inventors: Egan Schulz, Tysons, VA (US); Hrag Chanchanian, Tysons, VA (US); Jason Meyer Quint, Tysons, VA (US)

(73) Assignee: Scout Motors Inc., Tysons, VA (US)

( * ) Notice: Subject to any disclaimer, the term of this patent is extended or adjusted under 35 U.S.C. 154(b) by 167 days.

(21) Appl. No.: 18/614,009

(22) Filed: Mar. 22, 2024

(65) Prior Publication Data

US 2025/0296585 A1 Sep. 25, 2025

(51) Int. Cl.

| | |
|---|---|
| ***B60W 50/10*** | (2012.01) |
| ***B60H 1/00*** | (2006.01) |
| ***B60W 10/30*** | (2006.01) |
| ***G06F 3/0482*** | (2013.01) |
| ***G06F 3/04847*** | (2022.01) |

(52) U.S. Cl.

CPC ......... *B60W 50/10* (2013.01); *B60H 1/00985* (2013.01); *B60W 10/30* (2013.01); *G06F 3/0482* (2013.01); *G06F 3/04847* (2013.01); *B60W 2540/215* (2020.02)

(58) Field of Classification Search

None

See application file for complete search history.

(56) References Cited

U.S. PATENT DOCUMENTS

2008/0077291 A1* 3/2008 Kolletzki ............ G06F 3/04847 701/36

2023/0391194 A1* 12/2023 Dellinger .................. B60R 1/00

* cited by examiner

*Primary Examiner* — Hongye Liang

(74) *Attorney, Agent, or Firm* — Meunier Carlin & Curfman LLC

(57) ABSTRACT

A vehicle can operate according to user-defined operating modes, which are created by: presenting a first graphical user interface (GUI) that includes a menu of configurable functions associated with a plurality of subsystems of the vehicle that can be selected by a user to generate a user-defined operating mode, each of the configurable functions associated with at least one of an operating parameter or an executable action; receiving an indication of at least one first user input associated with a selection of one or more of the configurable functions from the menu; receiving an indication of a second user input defining a trigger event for the user-defined operating mode; generating the user-defined operating mode based on the at least one first user input and the second user input; and controlling the plurality of subsystems to operate according to the user-defined operating mode in response to detecting the trigger event.

20 Claims, 7 Drawing Sheets

CUSTOMIZABLE OPERATING MODES FOR VEHICLES

BACKGROUND

Modern advancements in the design, fabrication, and capabilities of computing hardware (e.g., memory, processing circuits, etc.) have led to the integration of more advanced computing solutions into various systems and devices. Modern vehicles often include multiple computing devices or systems-commonly referred to as “electronic control units” or ECUs—that control the operations of the vehicle and the systems therein. For example, an internal combustion engine (ICE) vehicle may include one or more of an engine control module (ECM), powertrain control module (PCM), transmission control module (TCM), brake control module (BCM or EBCM), central control module (CCM), central timing module (CTM), general electronic module (GEM), body control module (BCM), and suspension control module (SCM). Instead of an ECM and TCM, electric vehicles (EVs) may include a vehicle control unit (VCU), a motor control unit (MCU), and/or other types of computing devices. Despite having these sorts of advanced control systems, modern vehicles offer little in the way of user customization and often limit users to manufacturer-defined operating modes, parameters, and settings.

SUMMARY

One implementation of the present disclosure is a controller for a vehicle, the controller including: at least one processor; and memory having instructions stored thereon that, when executed by the at least one processor, cause the controller to: present a first graphical user interface (GUI) that includes a menu of configurable functions associated with a plurality of subsystems of the vehicle that can be selected by a user to generate a user-defined operating mode, wherein each of the configurable functions is associated with at least one of an operating parameter or an executable action of one of the plurality of subsystems; receive an indication of at least one first user input associated with a selection of one or more of the configurable functions from the menu; receive an indication of a second user input defining a trigger event for the user-defined operating mode; generate the user-defined operating mode based on the at least one first user input and the second user input; and control the plurality of subsystems of the vehicle to operate according to the user-defined operating mode in response to detecting the trigger event.

Another implementation of the present disclosure is a method of controlling a vehicle according to a user-defined operating mode, the method including: presenting a first graphical user interface (GUI) that includes a menu of configurable functions for a plurality of subsystems of the vehicle, wherein each of the configurable functions is associated with at least one of an operating parameter or an executable action of one of the plurality of subsystems; receiving an indication of at least one first user input associated with a selection of one or more of the configurable functions from the menu; receiving an indication of a second user input defining a trigger event for the user-defined operating mode; generating the user-defined operating mode based on the at least one first user input and the second user input; and causing the plurality of subsystems of the vehicle to operate according to the user-defined operating mode in response to a determination that the trigger event is met.

Yet another implementation of the present disclosure is a vehicle including: a plurality of vehicle systems, including at least an interior lighting system, a climate control system, a seating adjustment system, and an infotainment system; and a controller configured to control the plurality of vehicle systems according to any of a plurality of operating modes, including a user-defined operating mode, wherein when the user-defined operating mode is active, the controller is configured to: present, via a user interface device of the infotainment system, a first graphical user interface (GUI) that includes a menu of configurable functions for the plurality of vehicle systems, wherein each of the configurable functions is associated with at least one of an operating parameter or an executable action of one of the plurality of vehicle systems; receive, via the user interface device, at least one first user input associated with a selection of one or more of the configurable functions from the menu; receive, via the user interface device, a second user input defining a trigger event for the user-defined operating mode; and generate the user-defined operating mode based on the at least one first user input and the second user input; and control the plurality of vehicle systems according to the user-defined operating mode in response to a detecting the trigger event.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

Figure 1:
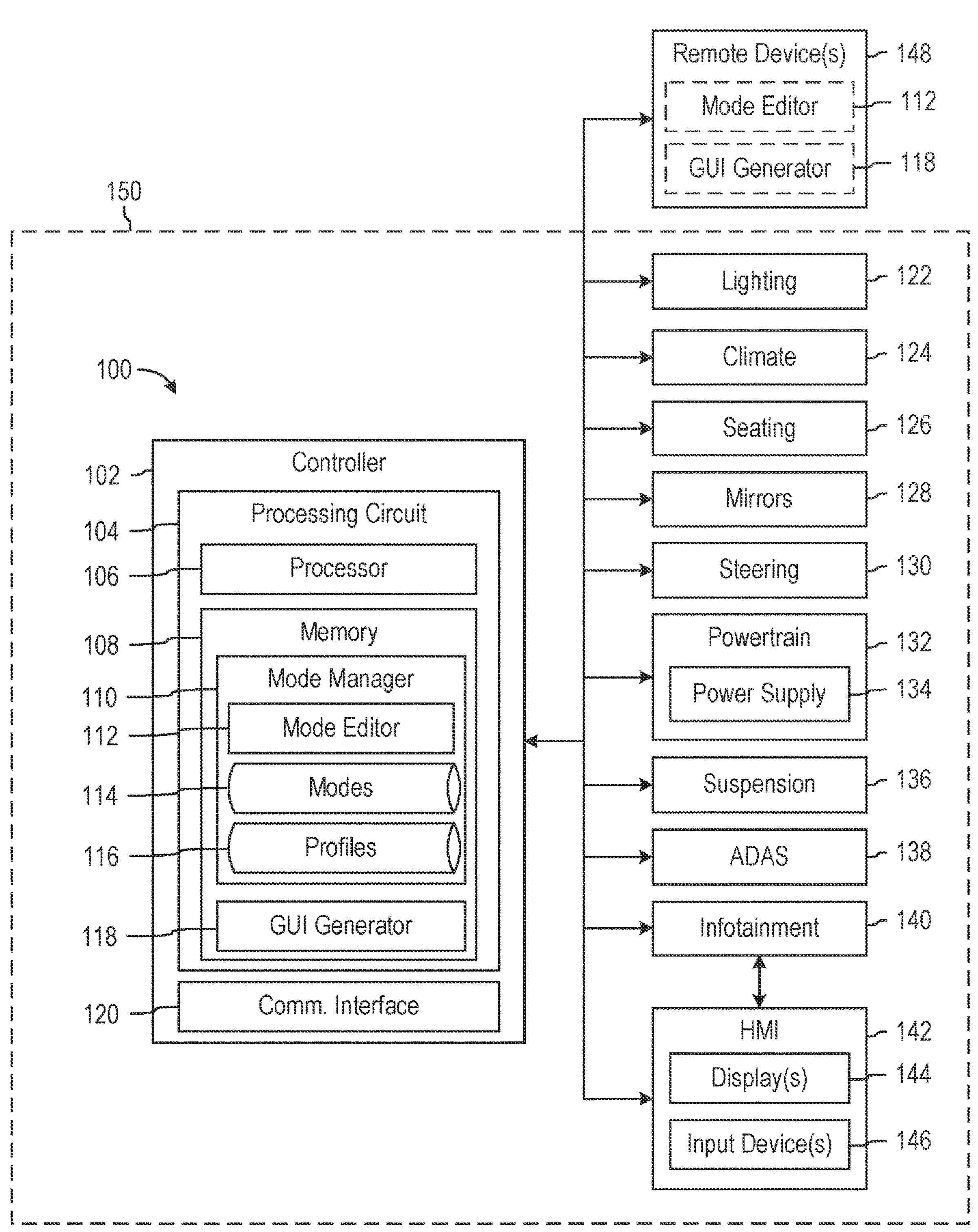
FIG. 1 is a block diagram of a control system for a vehicle, according to some implementations.

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Referring generally to the figures, a system and method for creating and using custom vehicle operating modes are shown, according to various implementations. As discussed herein, an “operating mode” generally refers to a predefined set of actions, parameters, settings, and the like, for a vehicle and/or the systems thereof, which can be selectively enabled to cause the vehicle to operate in a specific manner. For example, some vehicles may have a preprogrammed “sport” mode that, when activated, stiffens the suspension of the vehicle, changes the shift points of the transmission, quickens throttle response, and so on. In this regard, "sport" mode is an example of a fairly complex operating mode, e.g., which affects operations of multiple vehicle systems (e.g., suspension, powertrain, etc.). It should be appreciated that vehicle operating modes can range in complexity (e.g., affecting just one, or multiple, vehicle systems), as discussed in greater detail below. For example, stored "driver profiles" that include settings for the position of a driver's seat, mirrors, etc., may also be considered a type of operating mode because they can be selectively activated to cause vehicle systems (e.g., motorized seating, mirrors, etc.) to operate in a certain manner.

"Custom" refers to operating modes that are generated and/or modified by a user (e.g., an operator of the vehicle). As discussed in greater detail below, for example, a custom operating mode may include actions, parameters, settings, etc., that are selected by a user, e.g., rather than being predefined by a vehicle manufacturer. Therefore, "custom vehicle operating modes" are alternatively referred to herein as "user-defined" operating modes. As mentioned above, despite including numerous advanced computing devices for controlling vehicle system operations, modern vehicles often give users very little control over operating modes, settings, etc. For example, as also mentioned above, some vehicles may allow operators to create driver profiles that include a preferred seating position and, perhaps, infotainment settings (e.g., favorite radio stations, saved Bluetooth® connections, etc.); however, this is typically where customization ends.

In contrast, the disclosed system and methods allow users of a vehicle to create and use their own "user-defined" operating modes that take advantage of the advanced capabilities of modern vehicles, without limiting users to predefined operating modes that may be programmed by a manufacturer. As an example, in recent years, many people have become accustomed to picking up meals and then eating them in the back seat of their car—a scenario that was previously uncommon and therefore not considered by automotive manufacturers. In this example, the operator of a vehicle could move their seat and/or a passenger seat as far forward as possible to maximize room in the back seat, e.g., so that the operator and/or a passenger could cat in the back seats of the vehicle in comfort. Typically, moving the seats in this manner is performed manually, e.g., by the vehicle operator.

In some more modern vehicles, a user could create a "driver profile" that defines seating positions for the front seats, e.g., in a maximum forward position for the driver and passenger seats, to act as a sort of custom "eating" or "restaurant" mode. However, this is typically the extent of vehicle customization. That is to say, users are often limited to only minor customizations, such as seat position, interior lighting, and the like, and are prevented from accessing most vehicle features. Moreover, the customization that can be performed is often simple—including just a few actions or parameters—and is not always intuitive to set up (e.g., in the example above, the user has to "hack" a driver profile for use in a way that it was not intended). Further, the few vehicles that do allow for saving seating positions or "driver profiles" are often limited in the number of driver profiles and/or seating positions that can be saved (e.g., typically, to two driver profiles); therefore, creating a "driver profile" or saving seating positions for a "restaurant" or "eating" mode may use one of only a few available profiles or memory settings, which is not ideal for vehicles that have multiple operators.

To these points, the user-defined operating modes that can be created using the disclosed system and methods allow for much greater customization and access to otherwise inaccessible vehicle features and systems. Users can create complex, "multi-action" and/or "multi-parameter" operating modes based on their needs via a user-friendly interface. In particular, as discussed below, a user can create a user-defined operating mode by selecting multiple different actions and/or setting multiple different operating parameters—collectively referred to herein as "configurable functions"—for the vehicle and systems thereof. In some implementations, the configurable functions are provided to the user via an intuitive graphical user interface (GUI) on one of a human-machine interface (HMI) of the vehicle or a remote computing device (e.g., the user's smartphone).

One example of a user-defined operating mode that could be created using the disclosed system and methods is a "baby-changing mode." In this operating mode, e.g., activated by a user selecting via a user interface (UI) of the vehicle, the user may program a rear hatch of the vehicle to open and/or a tailgate to drop down into an "open" position, thereby creating a surface on which the baby can be changed. Additionally, the user may program a climate control system of the vehicle to activate rear vents, e.g., closest to the tailgate, to blow air out the back end of the vehicle to remove smells. In conjunction, the user could program the climate control system to increase a temperature of the air from the vents to improve the comfort of the baby while exposed. As another possibility, the user could program interior lights at the rear of the vehicle to remain on (e.g., as opposed to timing out as interior lights normally do). If the vehicle is equipped with air suspension, the user could program the rear suspension of the vehicle to lower to a more comfortable height for changing the baby on the surface created by the tailgate.

Another example of a user-defined operating mode that could be created using the disclosed system and methods is, as mentioned above, an "eating mode" or "restaurant mode." In this example operating mode, the user may program both front seats to move as far forward as possible to create as much space as possible in the rear of the vehicle. The user could also program the rear seats to warm or cool (e.g., by activating seat heating elements or ventilation) to improve comfort. Perhaps, the user programs the vehicle's infotainment system to play a preset music playlist and/or to display a particular image or video (e.g., the interior of a restaurant, a fireplace, etc.), and/or programs the interior lights of the vehicle to dim or change to a more pleasing color. The user could even program specific ambient lights, e.g., above the cup holders in the rear of the vehicle or in a storage compartment of the door cards, to become brighter or to flicker (e.g., on/off) to create a "candle lit" feel, so that they can always see their drink and/or find extra napkins and utensils.

Vehicle Control System

Referring now to FIG. 1, a block diagram of a vehicle control system 100 is shown, according to some implementations. As described herein, it should be appreciated that control system 100 is generally installed in/on a vehicle 150—or is formed of various components of vehicle 150—and is configured to control or affect operations of vehicle 150, including to operate vehicle 150 in a plurality of different predefined and/or user-defined operating modes, as discussed below. Vehicle 150, as described herein, may generally be any type of motor vehicle or "automotive vehicle," such as a car, truck, sport utility vehicle (SUV), crossover utility vehicle (CUV), or the like. In some implementations, vehicle 150 is an electric vehicle. As used herein, "electric vehicle" refers to any type of vehicle that includes an electric motor as a primary mover (e.g., source of propulsion). Accordingly, in some such implementations, vehicle 150 may be a battery electric vehicle (BEV), a hybrid electric vehicle (HEV), or a plug-in hybrid electric vehicle (PHEV). However, other implementations are contemplated herein in which vehicle 150 is instead primarily powered by an ICE and therefore is not considered an "electric vehicle."

At the heart of control system 100 is a controller 102 configured to control, directly and/or indirectly, a plurality of subsystems of vehicle 150 (also referred to herein as simply "vehicle systems") according to various predefined and/or user-defined operating modes, as discussed in greater detail below. Directly controlling a vehicle subsystem, as described herein, generally refers to transmitting control signals to the vehicle subsystem, or components thereof, to affect operations of the vehicle subsystem or components thereof. In contrast, indirectly controlling a vehicle subsystem generally refers to transmitting data (e.g., instructions) or control signals to a separate controller or computing device associated with the vehicle subsystem, or components thereof, to cause the separate controller or computing device to affect operations of the vehicle subsystem or components thereof. While illustrated as a single and distinct component of vehicle 150, it should be appreciated that controller 102, or the functionality thereof, may alternatively be part of, or implemented by, multiple distributed controllers or computing devices. For example, controller 102 may be a VCU or may be part of a VCU, or controller 102 may include one or more of a VCU, a BCM, a CTM, and/or other controllers in a vehicle.

Regardless of its implementation, controller 102 is shown to include a processing circuit 104 which further includes a processor 106 and memory 108. Processor 106 can be a general-purpose processor, an application-specific integrated circuit (ASIC), one or more field programmable gate arrays (FPGAs), a group of processing components (e.g., a central processing unit (CPU)), or other suitable electronic processing structures. In some implementations, processor 106 is configured to execute program code stored on memory 108 to cause controller 102 to perform one or more operations, as described below in greater detail. It will be appreciated that, in implementations where controller 102 is part of another computing device, the components of controller 102 may be shared with, or the same as, the host device. For example, if controller 102 is implemented via a VCU of vehicle 150, e.g., that performs other vehicle control functions, then controller 102 may utilize the processing circuit, processor(s), and/or memory of the VCU to perform the functions described herein.

Memory 108 can include one or more devices (e.g., memory units, memory devices, storage devices, etc.) for storing data and/or computer code for completing and/or facilitating the various processes described in the present disclosure. In some implementations, memory 108 includes tangible (e.g., non-transitory), computer-readable media that stores code or instructions executable by processor 106. Tangible, computer-readable media refers to any physical media that is capable of providing data that causes controller 102 to operate in a particular fashion. Example tangible, computer-readable media may include, but is not limited to, volatile media, non-volatile media, removable media, and non-removable media implemented in any method or technology for storage of information such as computer-readable instructions, data structures, program modules, or other data. Accordingly, memory 108 can include random access memory (RAM), read-only memory (ROM), erasable programmable read-only memory (EPROM), electronically erasable programmable read-only memory (EEPROM), hard drive storage, temporary storage, non-volatile memory, flash memory, optical memory, or any other suitable memory for storing software objects and/or computer instructions. Memory 108 can include database components, object code components, script components, or any other type of information structure for supporting the various activities and information structures described in the present disclosure. Memory 108 can be communicably connected to processor 106, such as via processing circuit 104, and can include computer code for executing (e.g., by processor 106) one or more processes described herein.

While shown as individual components, it will be appreciated that processor 106 and/or memory 108 can be implemented using a variety of different types and quantities of processors and memory. For example, processor 106 may represent a single processing device or multiple processing devices. Similarly, memory 108 may represent a single memory device or multiple memory devices. Additionally, in some implementations, controller 102 may be implemented within a single computing device (e.g., one module, one housing, etc.). In other implementations, controller 102 may be distributed across multiple computing devices (e.g., that can exist in distributed positions on vehicle 150). For example, as mentioned above, controller 102 may include multiple distributed computing devices (e.g., multiple processors and/or memory devices), such as a VCU, BCM, CTM, etc., in communication with each other, that collaborate to perform operations described herein.

Memory 108 is shown to include a mode manager 110 that facilitates the creation, modification, and use of user-defined operating modes. In particular, mode manager 110 is shown to include a mode editor 112, discussed in greater detail below, that allows users to create and edit custom vehicle operating modes. Mode manager 110 is also shown to include an operating modes database 114 for maintaining a plurality of pre-generated (e.g., manufacturer-designed) and/or user-defined operating modes. For example, when a custom operating mode is created by a user, it can be stored in operating modes database 114 for later use. In some implementations, as also discussed in greater detail below, mode manager 110 includes an operator profile database 116 for maintaining profiles associated with various operators of vehicle 150. An operator profile may store information relating to a user's preferred vehicle settings, such as seating position, mirror and steering assembly positions, saved radio stations, etc., and, in the context of the present disclosure, can also store information about the associated operators' custom (e.g., user-defined) operating modes.

As mentioned, mode editor 112 facilitates the creation and/or modification of custom vehicle operating modes—referred to herein as "user-defined" operating modes. As mentioned above, a user-defined operating mode refers to a mode of operation of vehicle 150, or one or more systems thereof, based on user-selected actions and/or user-defined settings/parameters—herein referred to as "configurable functions." More specifically, a configurable function is any action that can be selectively performed by a system of vehicle 150 and/or any operating parameter that affects how a system of vehicle 150 operates. "Operating parameters" refer to, for example, system or device settings, thresholds, or any other parameter associated with the function of vehicle 150 and the systems thereof. As an example, a configurable function associated with an action may include causing a lighting system 122 of vehicle 150 to activate/deactivate select lighting zones or controlling a suspension system 136 of vehicle 150 to raise or lower at least one corner of vehicle 150. Another example of a configurable function includes temperature settings for a climate control system 124 of vehicle 150, e.g., that affect operations of climate control system 124, or a position setting for a seating system 126 of vehicle 150. Each of lighting system 122, climate control system 124, seating system 126, and suspension system 136 are described in greater detail below. It should also be appreciated that configurable functions may include a mix of actions and operating parameters. For example, a configurable function for seating system 126 may not only define a position setting(s) for driver's seat and/or a passenger seat of vehicle 150 but may also cause the driver's seat and/or a passenger seat of vehicle 150 to move according to the position setting(s) when the user-defined operating mode is activated.

Before continuing, it should be understood that only a few possible configurable functions are discussed herein for brevity, but that a wide range of configurable functions for use in user-defined operating modes are contemplated. Those in the art will appreciate that modern vehicles can have multiple complicated systems, which allows for numerous potential configurable functions. Vehicle 150, for example, is shown to include lighting system 122, climate control system 124, seating system 126, and various other systems, each of which may be associated with multiple configurable functions. Further, different manufacturers may allow for different levels of customization; thus, functions that are user-configurable in one vehicle may not be user-configurable in another, based on manufacturer preferences. It should therefore be appreciated that the various configurable functions discussed herein are not intended to be an exhaustive list of all configurable functions and that the present disclosure is not intended to be limiting as to what sort of action, setting, or parameter associated with operations of a vehicle can be defined as a "configurable function."

In facilitating the creation and/or modification of user-defined operating modes, mode editor 112 may maintain a list or database of configurable functions that are available or permitted for vehicle 150. As mentioned above, this list or database of configurable functions may be predefined by a manufacturer of vehicle 150 (e.g., controller 102 may be programmed during production with the list or database of configurable functions) and may include all of the configurable functions that are available to a user. For example, in some implementations, a list or database of configurable functions may be stored on controller 102, e.g., prior to vehicle 150 leaving the factory after production. However, it should be appreciated that the list or database of configurable functions may be provided and/or updated at any time, e.g., by connecting controller 102 to the Internet to download an update, via an over-the-air (OTA) update, etc. In some implementations, a user may be presented with an indication of the configurable functions via a graphical user interface (GUI), e.g., presented via an HMI 142 of vehicle 150 or via a user interface of a remote device 148, as discussed in greater detail below. In this manner, the user may be able to select configurable function(s) and/or may enter parameters for configurable function(s) via the GUI in creating a user-defined operating mode.

To clarify, when creating a user-defined operating mode, a user may select one or more configurable function(s) to include in the user-defined operating mode. In this regard, "selecting" may refer to choosing an action to include in the user-defined operating mode, activating/deactivating a particular system, component, or function of vehicle 150, but can also refer to entering settings/parameters for a system, component, or function of vehicle 150 that affect how the system, component, or function operates. Consider the "baby-changing mode" described above, for example. To create such an operating mode, the user may select a combination of configurable functions, including to: actuate the rear hatch of vehicle 150 to an "open" position, actuate the tailgate of vehicle 150 to an "open" position, direct airflow of climate control system 124 to rear vents, set a fan speed of climate control system 124 to "high," activate a set of interior lights at the rear of vehicle 150, and/or control suspension system 136 to lower the rear of 150. In this regard, the "baby-changing mode" example demonstrates how a user-defined operating mode can include any combination of configurable functions, e.g., based on vehicle settings, operating parameters, and/or actions.

Despite allowing users quite a bit of flexibility in creating their own user-defined operating mode, it will be appreciated that certain limitations may be applied to prevent contradicting configurable functions from being selected and/or to help ensure safe operations in a user-defined operating mode. For example, it would not be safe to allow the tailgate of vehicle 150 to actuate to an "open" position when vehicle 150 is in motion, or it may not make sense (or be possible) to allow climate control system 124 to operate the front vents of vehicle 150 at maximum cooling while operating the rear vents of vehicle 150 at maximum heating. Depending on the granularity at which a manufacturer establishes configurable functions, it could also be possible that contradicting configurable functions would be selected. For example, it would be a contradiction for a user to select a first configurable function that causes the rear of vehicle 150 to lower and a second configurable function that causes the rear of vehicle 150 to raise, in the same user-defined operating mode.

Accordingly, in some implementations, mode editor 112 further considers a series of configuration rules, e.g., during the creation and/or use of user-defined operating modes, that dictate which configurable functions can be selected/used together (e.g., within the same user-defined operating mode) and/or that dictate conditions of vehicle 150 that must be met for a configurable function to be used. As an example, the configuration rules may dictate whether a configurable function is a "driving" or "non-driving" function, where a "driving" function is permitted for use when vehicle 150 is moving and a "non-driving" function is permitted for use only when vehicle 150 is not moving. Additionally, in this example, some configurable functions may be both "driving" and "non-driving" eligible. Following the example mentioned above, configurable function(s) associated with raising/lowering the tailgate of vehicle 150 may be associated with "non-driving" rules, so that the configurable function(s) cannot be used when vehicle 150 is in motion.

Based on any predefined configuration rules (e.g., during the creation of a user-defined operating mode), mode editor 112 may prevent a user from selecting contradicting configurable functions and/or may limit the list of configurable functions available to a user based on a previous selection of a configurable function. In some such implementations, mode editor 112 is configured to implement configuration rules by filtering the list of configurable functions presented or otherwise available to the user, when creating a user-defined operating mode; however, other techniques of implementing configuration rules are also contemplated. Say, for example, that a user selects a first configurable function that would cause a driver's door to open (e.g., in a configuration where the doors of vehicle 150 are motorized)—a function that may be associated with a "non-driving only" rule. Responsive to this selection, mode editor 112 may filter the list of configurable functions presented to the user to remove any "driving" eligible configurable functions, e.g., based on the aforementioned configuration rules, so that only "non-driving" functions are shown. Additionally, or alternatively, mode editor 112 may cause a notification to be presented to the user indicating that the selected first configurable function cannot be used when vehicle 150 is in motion.

As described herein, any configuration rules that are to be considered by mode editor 112 may be maintained in a list or database by mode editor 112. In some such implementations, the configuration rules may be stored in a list/database separate from the configurable functions, in which case the configuration rules may be mapped or otherwise associated with a list/database of configurable functions. Alternatively, configuration rules may be directly associated with or included in the configurable functions themselves (e.g., within a database entry associated with a corresponding configurable function). For example, a manufacturer may preset configuration rules when generating the configurable functions that are available to a user.

In addition to selecting/defining the configurable functions for a user-defined operating mode, in some implementations, a user is further able to select/define a trigger event for the user-defined operating mode. A trigger event is, as per its namesake, any condition or set of conditions that, when met, cause the user-defined operating mode to be activated—in turn, causing vehicle 150 and the systems thereof to operate according to the user-defined operating mode. In some implementations, the trigger event is a user input via HMI 142 or another user input device. For example, the user may choose to create an icon for their user-defined operating mode, which is displayed via HMI 142, or to add an indication of the user-defined operating mode to a menu of available operating modes. As another example, HMI 142 may include a microphone such that a user-defined operating mode can be activated by voice commands (e.g., a user speaking the phrase "Activate Operating Mode A").

Notably, in some implementations, mode editor 112 can allow a user to assign a user-defined operating mode to a physical button or switch within vehicle 150, such that actuation of the physical button or switch (e.g., by an operator of vehicle 150) causes the user-defined operating mode to be activated. For example, the user may assign their newly created user-defined operating mode to an overhead accessory switch so that the user-defined operating mode can be activated/deactivated by toggling the overhead accessory switch. As described herein, it should be appreciated that a "physical switch" is any button or switch that is not part of a GUI. For example, a physical switch could include a button, toggle, or even a capacitive button. It should be appreciated, however, that it may not always be necessary for a user to separately select/define a trigger event. For example, in some implementations, newly created user-defined operating modes may simply be added to a menu or list of user-defined operating modes such that they are selectable via HMI 142.

In some implementations, in addition to or in lieu of a user input-based trigger (e.g., selection via HMI 142, actuation of a physical button or switch, a voice command, etc.), other trigger events that are not associated with a user input may be applied to a user-defined operating mode. In this manner, certain user-defined operating modes may be activated autonomously or semi-autonomously. One such non-user-input-based trigger event could be, for example, a geofence or location-based trigger event, where the user-defined operating mode is activated when vehicle 150 is determined to be within a geofenced area or within a threshold distance of a preset location. Another example of a non-user-input-based trigger event could be a time-based trigger event. For example, a user could create a user-defined operating mode that adjusts the color and intensity of the interior lights of vehicle 150 after a specific time (e.g., 5:00 pm). Or, as another example, this user-defined operating mode could be activated when vehicle 150 detects ambient light below a threshold level. It should be appreciated that various other non-user-input-based trigger events that could be realized by those of ordinary skill in the art are also contemplated herein, even if not expressly disclosed; therefore, the present disclosure is not intended to be limiting in this regard.

Once a user has selected/defined the configurable function(s) for a user-defined operating mode, and has optionally established a trigger event, mode editor 112 may generate the user-defined operating mode and store the user-defined operating mode in operating modes database 114. As described herein, "generating" the user-defined operating mode can refer to creating the user-defined operating mode from the user-selected/defined configurable function(s). For example, generating a user-defined operating mode can include compiling and storing the user-defined operating mode in operating modes database 114. This can be as simple as creating a database entry for the user-defined operating mode that indicates the associated configurable functions, trigger event, etc. As another example, generating a user-defined operating mode can include generating a routine and/or instructions for activating the user-defined operating mode, e.g., which can be used to control the various components of vehicle 150. However, it should be appreciated that the present disclosure is not intended to be limited in this regard. From operating modes database 114, the user-defined operating mode can be later referenced for use with vehicle 150.

In some implementations, the user-defined operating mode(s) maintained in operating modes database 114 can be associated with a particular operator profile in operator profile database 116. For example, each user-defined operating mode may include an identifier associated with at least one profile in operator profile database 116 or, alternatively, operating modes database 114 may include separate sets of user-defined operating mode associated with each profile in operator profile database 116. In this manner, a user can create user-defined operating modes specific to themselves and/or based on their own preferences. Additionally, or alternatively, in some implementations, a user may be able to dictate whether their user-defined operating mode(s) are available to other users of vehicle 150. For example, a user could limit their user-defined operating mode(s) to be used only when their profile is active or could allow their user-defined operating mode(s) to be accessed when the profile of another user is active.

Say, for example, that vehicle 150 has two regular operators—"Driver A" and "Driver B"—that each have their own profile in operator profile database 116. In this regard, each of Driver A and Driver B can create their own user-defined operating mode(s), which are stored in operating modes database 114 and associated with their respective profiles. However, in some implementations, Driver A could make one or more of their user-defined operating mode(s) accessible to Driver B, such that Driver B can use Driver A's user-defined operating mode(s), or vice versa. It should be appreciated that, as described herein, operator profiles may be activated by any suitable technique. For example, an operator profile may be activated responsive to a user input to HMI 142 (e.g., the operator selecting their profile from a GUI) or based on an identifier for a key associated with the operator. As another example, operator profiles could be activated based on voice or image recognition of the operator of vehicle 150, based on communications with a personal computing device (e.g., smartphone) carried by the operator, or by any other suitable technique. It should therefore be appreciated that the present disclosure is not intended to be limiting in this regard.

In addition to facilitating the creation of user-defined operating modes, as mentioned above, mode editor 112 may also be configured to facilitate the editing or modification of previously generated user-defined operating modes. When editing or modifying a user-defined operating mode, for example, a user may be able to add or remove configurable functions and/or set new parameters for configurable functions. In some cases, a user could change the trigger event for a user-defined operating mode. In this regard, responsive to a request to edit a user-defined operating mode, mode editor 112 may retrieve the user-defined operating mode and/or information relating to the user-defined operating mode from operating modes database 114 and cause a GUI for editing the user-defined operating mode to be displayed. After the user completes their edits/modifications (e.g., adding/removing configurable functions, setting new parameters for configurable functions, etc.), mode editor 112 may be configured to regenerate the user-defined operating mode. Alternatively, mode editor 112 may generate a new user-defined operating mode and delete data associated with the original (e.g., non-edited) user-defined operating mode.

While generally described herein as being a component of mode manager 110, and thereby as being implemented via controller 102, it should be understood that other configurations are contemplated herein in which mode editor 112 is implemented by or hosted on another device, separate from controller 102. In other words, it should be appreciated that mode editor 112, or the functions thereof, may be separate from mode manager 110 and therefore implemented by a different computing device. For example, in some implementations, mode editor 112 and/or the functions thereof are implemented via remote device 148. As discussed below, for example, remote device 148 may be a smartphone or other computing device that is external to control system 100, such that a user could create user-defined operating modes remotely (e.g., without being in the physical presence of vehicle 150). In some such implementations, mode editor 112 could be implemented via a software application (e.g., a "smartphone app") running on remote device 148 and/or could be accessed via a web browser through remote device 148.

Generally, even if implemented through remote device 148, the functionality of mode editor 112 is the same as what is described above—e.g., a list of available configurable functions is presented, user inputs selecting one or more configurable functions and/or defining parameters for one or more configurable functions are received, a user input defining trigger events is received, and the user-defined operating mode is generated. Then, if implemented through remote device 148, mode editor 112 may transmit the user-defined operating mode to mode manager 110, e.g., to be stored in operating modes database 114 for later retrieval and/or use.

In some such implementations, the user-defined operating mode can be automatically associated with an operator profile (e.g., in operator profile database 116) upon receipt by mode manager 110, based on identifying information about remote device 148 and/or based on information included by remote device 148, e.g., identifying a user that created the user-defined operating mode.

Remote device 148, as mentioned herein, may generally represent any computing device or system that is external to vehicle 150 and/or the systems thereof. For example, remote device 148 may be a smartphone, a table, a personal computer, or the like, which can communicate with controller 102 to receive and/or send data. As discussed above, for example, remote device 148 may be configured to host mode editor 112 such that user-defined operating modes can be created remotely from vehicle 150 and transmitted (e.g., uploaded) to controller 102. In one specific example, remote device 148 may represent a smartphone owned/operated by an operator of vehicle 150. It should be appreciated, however, that remote device 148 may represent more than one remote computing device. For example, remote device 148 may include multiple smartphones, each associated with a different operator of vehicle 150. Remote device 148 can also be connected to other remote devices, e.g., via a network (not shown). For example, if remote device 148 is a smartphone, then remote device 148 may be able to communicate with other smartphones, computers, servers, etc., via a wireless network, such as the Internet (e.g., accessed via a cellular or Wi-Fi connection).

Notably, in some implementations, user-defined operating modes that are created using mode editor 112 can be shared to/via remote device 148. For example, users may be presented with an option to share their user-defined operating modes with other users (e.g., owners of other vehicles similar to vehicle 150), e.g., via the Internet, and/or may otherwise selectively enable sharing of their user-defined operating modes. In this regard, shared user-defined operating modes, or information related thereto, can be transmitted to remote device 148 (e.g., from controller 102) and/or from remote device 148 to other remote devices. In some implementations, user-defined operating modes can be uploaded and/or stored on a remote server or other device, such that they are accessible by various other users. For example, a database of user-defined operating modes that are shared by owners of different vehicles (e.g., of the same brand as vehicle 150) may be hosted online such that the owners can browse and download user-defined operating modes to be implemented on their own vehicles. Additional discussion relating to the sharing of user-defined operating modes is provided below.

Once a user-defined operating mode is generated, mode manager 110 is configured to monitor for a trigger event of the user-defined operating mode and to activate the user-defined operating mode when the trigger event is detected. In this regard, mode manager 110 may be configured to monitor for the trigger events of multiple user-defined operating modes (e.g., in operating modes database 114) and to selectively activate the user-defined operating modes when their respective trigger events are met. As mentioned above, a trigger event could be a user input to HMI 142, e.g., via a touchscreen display or manipulation of a physical button/switch; however, other trigger events (e.g., location-based, condition-based, etc.) are contemplated herein.

As discussed, "activating" a user-defined operating mode generally refers to operating vehicle 150, and the systems thereof (e.g., control system 100), according to the user-defined operating mode. With reference to the discussion of the "configurable functions" that make up a user-defined operating mode, above, operating vehicle 150 and the systems thereof according to the user-defined operating mode can include causing a component or system of vehicle 150 to perform some action, adjusting the performance of actions that are actively being performed by vehicle 150, and/or setting or modifying an operating parameter of vehicle 150. For example, as in the examples provided above, mode manager 110 could cause: various lights of vehicle 150 to turn on/off or change intensity/color; the suspension of vehicle 150 to selectively raise/lower; the tailgate/trunk of vehicle 150 to open/close; the infotainment system to play music; an adjustment to the climate settings of vehicle 150; and more.

In some implementations, mode manager 110 causes the various systems and/or components of vehicle 150 to operate according to the user-defined operating mode by transmitting control signals to the system(s) and/or component(s) of vehicle 150 directly. For example, mode manager 110 may be able to directly control lights within vehicle 150 to turn them on/off or may transmit a control signal to lighting system 122 to cause 122 to turn on/off select lights. In some implementations, mode manager 110 causes the various systems and/or components of vehicle 150 to operate according to the user-defined operating mode indirectly, by transmitting control signals and/or instructions to separate controllers or computing devices associated with the system(s) of vehicle 150, as discussed in greater detail below. For example, to raise/lower the suspension of vehicle 150, mode manager 110 may be configured to transmit instructions to a controller of suspension system 136 (e.g., an SCM), which causes the controller of suspension system 136 to control the individual suspension components accordingly. It should be appreciated, however, that mode manager 110 can also be configured to both transmit control signals directly to the various systems/components of vehicle 150 and to transmit control signals or information to separate controllers or computing devices associated with the system(s) of vehicle 150.

Responsive to detecting a trigger event for a user-defined operating mode, in some implementations, mode manager 110 is configured to determine whether vehicle 150 is able or permitted to operate according to the user-defined operating mode (e.g., prior to activating the user-defined operating mode). In this regard, mode manager 110 may determine whether activation conditions for the user-defined operating mode are met before controlling the systems/components of vehicle 150 (e.g., control system 100) accordingly, e.g., to ensure that vehicle 150 can operate safely. It should be appreciated that any number and type of activation conditions could be defined, e.g., by a manufacturer of vehicle 150. As mentioned above, for example, one such activation condition could be related to whether vehicle 150 is in motion or a "drive" mode. For example, if a user attempts to activate a user-defined operating mode that includes non-driving functions (e.g., opening a door or tailgate, raising/lowering the suspension, etc.) while vehicle 150 is in motion, mode manager 110 may deny or prevent the activation of the user-defined operating mode. In other examples, activation conditions could be defined based on a location, a speed, or the current operating mode of vehicle 150, or based on operating conditions of the various components of control system 100. For example, if vehicle 150 is an EV, mode manager 110 may evaluate whether the capacity of power supply 134 (e.g., a battery) is sufficient to operate according to the user-defined operating mode.

It should be appreciated that mode manager 110 can evaluate activation conditions in a number of different ways. In particular, mode manager 110 may evaluate data received from the various systems of control system 100 (e.g., lighting system 122, climate control system 124, seating system 126, etc.) to determine whether activation conditions are met. In some implementations, this data includes readings from various sensors positioned about vehicle 150 and/or otherwise included in the various systems of control system 100. For example, mode manager 110 may determine whether vehicle 150 is moving (e.g., to disable non-driving modes) based on data from wheel or motor speed sensors and/or a global positioning system (GPS) transceiver. As another example, mode manager 110 may determine whether there are obstacles within a vicinity of vehicle 150, e.g., which may affect the opening of a door or tailgate, or lowering/raising of the suspension, based on data from an advanced driver assistance system (ADAS) 138, as described below. Additional discussion of activation conditions is provided below with respect to FIG. 3.

While a user-defined operating mode is active and/or after activation of a user-defined operating mode, in some implementations, mode manager 110 may be configured to further monitor for an exit condition. Similar to activation conditions, mode manager 110 may determine whether an exit condition is met based on data from any of the systems, components, and/or sensors of vehicle 150. If an exit condition is detected and/or met, mode manager 110 may be configured to deactivate the user-defined operating mode and/or otherwise switch operations of vehicle 150 to a different operating mode. As with the activation conditions described above, it will be appreciated that any number and type of exit condition(s) may be defined. For example, exit conditions may be established to ensure safe operations of vehicle 150, to prevent damage to vehicle 150 and the components thereof, and/or for convenience.

In one example, vehicle speed can be used as an exit condition (e.g., as well as an activation condition), whereby a user-defined operating mode is deactivated if vehicle 150 is determined to be moving. In another example, an outside air temperature limit may be an exit condition for a user-defined operating mode that includes operating the air conditioning of climate control system 124. Specifically, mode manager 110 may cause the user-defined operating mode to deactivate if the outside air temperature drops below a temperature where the air conditioner of climate control system 124 is not able to further cool the air and/or where continued operations of the air conditioner could result in damage to climate control system 124 (e.g., at or below freezing temperatures). Additional discussion of exit conditions is provided below with respect to FIG. 3.

In addition to mode manager 110 and mode editor 112, as discussed above, memory 108 is shown to include a GUI generator 118 for generating GUIs to be presented via HMI 142. With reference to the discussions above, for example, GUI generator 118 may generate a GUI that includes a menu of manufacturer and/or user-defined operating modes, e.g., such that operating modes can be selected by a user. For example, GUI generator 118 may generate a GUI that includes selectable icons associated with different operating modes, including any user-defined operating modes. Notably, in some implementations, GUI generator 118 can generate GUIs for creating user-defined operating modes according to the method(s) described herein. For example, GUI generator 118 can generate GUIs that present a list of available configurable functions and/or that allow a user to select a trigger event for a user-defined operating mode. In some implementations, GUI generator 118 generates alerts or notifications to be presented via HMI 142. Some example GUIs that can be generated by GUI generator 118 are shown in FIGS. 4A-4H, discussed below. It should also be appreciated that, in implementations where mode editor 112 is hosted by a device remote from controller 102 (e.g., remote device 148), certain GUIs generated by GUI generator 118 may be presented via the remote device (e.g., as opposed to via HMI 142) and/or the remote device may include a separate GUI generator for generating various GUIs described herein.

Controller 102 is also shown to include a communications interface 120 that facilitates communications (e.g., the exchange of data) between controller 102 and various other components or devices of vehicle 150, including any of the subsystems shown in FIG. 1. In addition, communications interface 120 may facilitate communications with remote device 148 and/or any other devices that are external to vehicle 150. Accordingly, communications interface 120 can be or can include a wired or wireless communications interface (e.g., jacks, antennas, transmitters, receivers, transceivers, wire terminals, etc.) for conducting data communications, or can be or include any combination of wired and/or wireless communication interfaces. For example, communications interface 120 can include any combination of wireless transceivers (e.g., cellular transceivers, Wi-Fi transceivers, short-range radio transceivers, etc.) or wired transceivers (e.g., a fiber optic transceiver, a controller area network transceiver, etc.). In this regard, communications via communications interface 120 may be direct (e.g., local wired or wireless communications) or via a network (e.g., a CAN bus). It should be appreciated that communications interface 120 can also act as an input/output (I/O) interface for transmitting and receiving analog signals, e.g., from various sensors, as discussed below.

As mentioned above, control system 100 is shown to include various systems and components that each handle different functions and operations. Some of these systems and components are illustrated in FIG. 1, but it should be appreciated that vehicle 150 may include additional systems and components that are not shown. One such system (or "subsystem") of control system 100 that is shown in FIG. 1 is lighting system 122, also mentioned above. Lighting system 122 generally encompasses any of the interior and exterior lights of vehicle 150. For example, interior lights can include accent lighting (e.g., in the door cards, under the dashboard or in the footwells, in the cupholders, etc.) and overhead lighting (e.g., dome lights), among other lighting components. Exterior lights can include, for example, headlights, taillights, puddle lights, and the like. While not shown, it should be appreciated that lighting system 122 may include a separate controller and/or control circuitry for operating said lights. For example, various lights in lighting system 122 may be light-emitting diodes (LEDs) or LED arrays; therefore, lighting system 122 may include various drivers for controlling the color and/or intensity of the LEDs.

With reference to the discussion of controller 102 above, it should be appreciated that various configurable functions could be defined for lighting system 122, e.g., depending on the level of control provided to users by the manufacturer of vehicle 150. For example, configurable functions associated with lighting system 122 could include activating/deactivating select lights or select groups of lights, selecting a color or intensity (e.g., brightness) of select lights or select groups of lights, and/or otherwise changing how select lights or groups of lights operate. As also discussed above, in some implementations, mode manager 110 may control certain lights or groups of lights in lighting system 122 directly. In other implementations, mode manager 110 may transmit commands or instructions to a separate controller of lighting system 122 to affect control of the interior/exterior lights of vehicle 150.

Climate control system 124, also mentioned above, can include a plurality of components and/or subsystems for providing heating, cooling, and/or ventilation to an interior (e.g., cabin) of vehicle 150. In some implementations, climate control system 124 can include a blower motor that moves air through ducting (e.g., which is routed throughout vehicle 150) and a plurality of controllable (e.g., motorized) flaps or "doors" that control the direction of the air through the ducting to output vents (e.g., which output the air into the cabin of vehicle 150). For example, climate control system 124 may include a blend door, a recirculation door, and/or one or more additional doors for controlling which vents air is routed to or output from. Climate control system 124 may also include components such as an evaporator and/or heater core for cooling/heating the air before it is transferred to the output vents.

Notably, climate control system 124 may include a plurality of sensors, e.g., distributed about the cabin of vehicle 150, to measure air temperature, humidity, and/or other parameters. For example, climate control system 124 could include sensors positioned within the above-mentioned ducting for measuring the temperature of air routed therethrough, e.g., before it is output via vents. It should be appreciated that climate control system 124 can include additional components which are not shown in FIG. 1, or explicitly described herein, but which would be readily identifiable by those in the art. For example, in some implementations, climate control system 124 includes a separate controller that controls the blower motor, control flaps, etc., based on information from mode manager 110; however, as mentioned above, mode manager 110 may alternatively transmit commands or instructions to the components of climate control system 124.

As with lighting system 122, it should be appreciated that a range of configurable functions could be established for climate control system 124. In some implementations, the configurable functions relating to climate control system 124 are settings that cause climate control system 124 to operate in a particular manner. For example, configurable functions associated with climate control system 124 could include settings for: a temperature setpoint for vehicle 150 or multiple temperature setpoints for zones of vehicle 150, an air conditioning unit of climate control system 124 (e.g., on/off), a "defrost" mode (e.g., on/off), and more. As with the other example configurable functions described here, the configurable functions relating to climate control system 124 can provide any level of granularity with respect to user control. For example, configurable functions could be established that allow a user to set temperatures, fan speeds, etc., for individual vents or groups of vents within vehicle 150.

Seating system 126 generally includes any components relating to the front seats (e.g., driver's and passenger seats) and/or rear seats in vehicle 150. In particular, seating system 126 can include motors, controls, sensors, and/or other components for operating the front/rear seats. For example, a driver's seat of vehicle 150 may include one or more motors for adjusting an arrangement and/or positioning of the seat. Any of the seats of vehicle 150 may also include heating elements and/or ventilation for providing heating/cooling. In some implementations, seating system 126 can include components (e.g., installed in one or more seats of vehicle 150) for performing a massage function. For example, the driver and passenger seats of vehicle 150 may include motors, massage rollers, airbags, etc. In some implementations, seating system 126 can include sensors for detecting the presence of a person in a seat and/or for determining a current arrangement/positioning of each seat. It should be appreciated that seating system 126 can include additional components which are not shown in FIG. 1, or explicitly described herein, but which would be readily identifiable by those in the art. For example, in some implementations, seating system 126 includes a separate controller that controls the arrangement/position of any of the seats in vehicle 150, based on information from mode manager 110; however, as mentioned above, mode manager 110 may alternatively transmit commands or instructions to the components of seating system 126.

Mirrors 128 generally includes any components relating to the interior rear-view mirror and/or side mirrors of vehicle 150. For example, mirrors 128 can include motors or actuators used to adjust the positioning on any of the interior rear-view mirror and/or side mirrors of vehicle 150. In some implementations, mirrors 128 can include heating elements for warming the side mirrors of vehicle 150, e.g., to melt ice or snow build-up and/or prevent fogging. It should be appreciated that mirrors 128 can include additional components which are not shown in FIG. 1, or explicitly described herein, but which would be readily identifiable by those in the art. For example, in some implementations, mirrors 128 includes a controller (e.g., a BCM) for controlling the positioning of the side and/or rear-view mirrors. In other implementations, mode manager 110 may alternatively control the side and/or rear-view mirrors of vehicle 150 directly.

Steering system 130 generally includes components relating to the steering wheel assembly and/or steering of vehicle 150. For example, steering system 130 can include a steering wheel assembly and steering rack, among other components. The steering rack may include an electric motor, e.g., such that steering system 130 is considered an "electronic power steering" system. In some implementations, steering system 130 includes motors or actuators for adjusting a position of the steering wheel assembly of vehicle 150, e.g., based on user preferences. For example, steering system 130 may include motors or actuators for moving the steering wheel up or down, or for adjusting a distance of the steering wheel to an operator. In some implementations, the steering wheel of vehicle 150 includes a number of controls, e.g., in the form of buttons, such as for adjusting settings of infotainment system 140, controlling ADAS 138, etc., as discussed below. It should be appreciated that steering system 130 can include additional components which are not shown in FIG. 1, or explicitly described herein, but which would be readily identifiable by those in the art. For example, as with the other systems of control system 100 described herein, steering system 130 may include a controller separate from controller 102.

As discussed herein, some example configurable functions associated with seating system 126, mirrors 128, and/or steering system 130 could include settings dictating a position and/or arrangement of any of the seats in vehicle 150, settings dictating a position of any of the mirrors of vehicle 150, settings dictating a position of the steering wheel assembly of vehicle 150, and more. For example, an operator of vehicle 150 could set their preferred seating, mirror, and steering wheel position when generating a user-defined operating mode. Additionally, the configurable functions associated with seating system 126, mirrors 128, and/or steering system 130 could include turning on/off seat heating or ventilation, turning on/off heating elements in mirrors 128, turning on/off a heated steering wheel, etc. However, it should be appreciated that other configurable functions are possible and that the present disclosure is not intended to be limiting in this regard.

Powertrain 132 generally includes all of the components that provide power to the wheels of vehicle 150, e.g., to propel vehicle 150 forward or backward, or that otherwise affect the propulsion/movement of vehicle 150. A BEV powertrain, for example, typically includes components such as a power supply 134 (e.g., battery pack or other energy storage element (e.g., a supercapacitor)), an inverter, and at least one electric motor, among various other parts and components (e.g., axles or driveshafts, a cooling system, a charging system, etc.) that are not shown in FIG. 1 because they would be known to those of ordinary skill in the art. For example, vehicle 150 may include a controllable differential. In an ICE vehicle, vehicle 150 may include an ICE and transmission. In some implementations, the components of powertrain 132 are controlled via controllers that are separate from controller 102. For example, powertrain 132 could include a PCM and/or power supply 134 could include a BCM. Regardless, the components of powertrain 132 may be at least partially controlled by controller 102, e.g., either directly or through respective controllers.

Suspension system 136 generally includes the suspension components at each corner of vehicle 150. For example, suspension system 136 can include a plurality of shocks and/or struts, among other components. Notably, in vehicle 150, suspension system 136 can be controllable, e.g., to selectively raise/lower corners of vehicle 150, to adjust ride quality, etc. Accordingly, some implementations, suspension system 136 can include magnetic shocks/struts, air bags, or another type of suspension technology that can be electronically controlled. In some implementations, suspension system 136 can include various sensors for monitoring operations of the suspensions components. For example, suspension system 136 could include sensors that detect a position of each corner of vehicle 150 (e.g., with respect to ground, or a zero position) so that the corresponding suspension components can be adjusted accordingly. As with the other components of control system 100 described herein, in some implementations, the components of suspension system 136 are controlled via a controller that is separate from controller 102. For example, suspension system 136 could include a SCM. Regardless, the components of suspension system 136 may be at least partially controlled by controller 102.

Some example configurable functions associated with powertrain 132 and/or suspension system 136 could include activating/deactivating all-wheel drive (AWD), locking/unlocking a differential, raising/lowering specific corners of vehicle 150, settings that dictate a ride height and/or ride quality, settings that dictate how electric motors of powertrain 132 respond to inputs, etc. In some implementations, various configurable functions relating to powertrain 132 and/or suspension system 136 are linked, e.g., into preset groupings. For example, a "sport" mode could be defined as a selectable configurable function that causes powertrain 132 to deactivate AWD and quicken a response time to a user input to the accelerator pedal of vehicle 150, and that causes suspension system 136 to lower the ride height of vehicle 150. It should be appreciated that other configurable functions are possible and that the present disclosure is not intended to be limiting in this regard.

ADAS 138 can include a suite of sensors and other components that assist an operator with the safe operation of vehicle 150. In some implementations, ADAS 138 includes proximity sensors for detecting objects within a certain distance (e.g., a threshold distance) of vehicle 150. Proximity sensors may include, for example, ultrasonic sensors or the like. In some implementations, ADAS 138 includes a camera or camera(s) for detecting objects using captured image data. For example, the camera(s) of ADAS 138 may capture images or video of one or more areas surrounding vehicle 150, which is processed (e.g., by a dedicated computing device of ADAS 138 or controller 102) using object detection models to identify objects and detect obstacles. In some implementations, ADAS 138 includes one or more LiDAR or radar transceivers used for object detection, adaptive cruise control, blind spot monitoring, etc.

Infotainment system 140, as mentioned above, can include a collection of components that allow users to interact with and/or control vehicle 150, e.g., for the purposes of entertainment, viewing/modifying information, adjusting settings or operations, etc. To this point, infotainment system 140 generally includes a user interface that can present information to a user (e.g., via GUIs) and/or that can receive user inputs. In some implementations, this user interface is included in HMI 142. To this point, HMI 142 is generally configured to present (e.g., display) data to a user (e.g., an operator of vehicle 150) and to receive user inputs. HMI 142 may therefore include, in some implementations, a display 144, which is a device or component for presenting GUIs. Display 144 may include, for example, a liquid crystal display (LCD), a light-emitting diode (LED) display, or the like, capable of presenting GUIs in one or more colors. HMI 142 can also include, in some implementations, an input device 146 for receiving user inputs. Input device 146 can include, for example, a keypad, buttons, a microphone, a camera, or the like.

In some implementations, display 144 and input device 146, or the functionality thereof, may be combined into a single device, such as a touchscreen display. In some implementations, HMI 142 includes a touchscreen display in combination with one or more physical input devices, such as buttons, knobs, switches, etc. In the context of infotainment system 140, HMI 142 may include a display device and one or more user input device positioned at or near a center of a dashboard of vehicle 150. However, in some implementations, HMI 142 can include more than one display (e.g., display 144) and/or input component (e.g., input device 146). For example, HMI 142 may include both a touchscreen display positioned at or near a center of a dashboard of vehicle 150 (e.g., as an infotainment system) and may include a second display positioned in front of an operator of vehicle 150 (e.g., a digital gauge cluster). It should also be appreciated that, in some implementations, input device 146 may represent a plurality of different input devices. For example, input device 146 may include a touchscreen display (e.g., centered on the dashboard of vehicle 150) and multiple physical buttons or switches positioned about the interior of vehicle 150.

Regardless of the mechanism for user interaction(s), infotainment system 140 is generally configured to facilitate the playing of media (e.g., music, videos, etc.), adjustment of climate controls, and more. For example, in addition to one or more displays and one or more buttons, switches, etc., infotainment system 140 may include other input and output devices, such as microphone(s), camera(s), speaker(s), and the like. In this regard, it should be appreciated that infotainment system 140 may be in communication with multiple other systems of control system 100, e.g., directly or through controller 102. For example, a user may be able to adjust climate control settings, which affects the operation of climate control system 124, via a GUI presented by infotainment system 140 through HMI 142.

In some implementations, infotainment system 140 can further include a component or components that facilitate connections with remote devices (e.g., remote device 148), e.g., similar to communications interface 120. For example, infotainment system 140 may include one or more wired or wireless transceivers for establishing wired or wireless connections with external devices, such as a user's smartphone. In some such implementations, infotainment system 140 may include a Bluetooth® transceiver, or the like, and/or may include a Wi-Fi transceiver. As an example, infotainment system 140 may include a Wi-Fi transceiver that can create a local wireless network (e.g., a "hotspot") that various external devices can connect to, e.g., to access the Internet or functions of vehicle 150. In another example, infotainment system 140 may include a cellular or satellite transceiver for wirelessly connecting a network (e.g., the Internet). In some implementations, infotainment system 140 includes a global positioning system (GPS) transceiver, or the like, for determining a location of vehicle 150, e.g., for the purposes of navigation.

It should also be appreciated that various additional components and/or subsystems of vehicle 150 are not expressly shown in FIG. 1 or described herein, for the sake of brevity; rather, those in the art will appreciate the common types of systems and components that a modern vehicle may include, and which therefore may be controlled by controller 102. For example, powertrain 132 is not expressly shown to include electric motors, an inverter, wheels, etc., but it would be understood to those in the art that these parts are generally included in the powertrain of an electric vehicle. It should be understood that the omission of a detailed description of any such components of vehicle 150 is not intended to limit the present disclosure.

One such type of additional components and/or subsystems which are not explicitly shown are the various sensors that may be included in vehicle 150. For example, vehicle 150 could include a plurality of different body sensors 150, which refers to a wide range of additional sensors and sensing systems that can be found in modern electric vehicles. Body sensors can include, for example, an inertial measurement unit (IMU) for detecting a positioning (e.g., pitch, roll, yaw) and/or motion of vehicle 150, a GPS for determining a location and/or speed of vehicle 150, contact and/or airbag sensors for detecting contact with objects and/or deploying airbags, and more. Additionally, each system of control system 100 may include various sensors that are not shown. For example, in an electric vehicle, powertrain 132 may include sensors or other feedback devices such as wheel speed sensors, voltage or current sensors (e.g., for monitoring energy provided from a power source 134 to electric motors of powertrain 132), sensors that determine a rotational speed and direction of the motors of powertrain 132, and the like. The sensors of powertrain 132 may also represent feedback provided by components of powertrain 132 that are not sensing devices, per se. For example, an inverter may provide feedback on voltage, current, motor speed and direction, etc., without directly measuring these variables using a dedicated sensor.

Creating Custom Operating Modes

Figure 2:
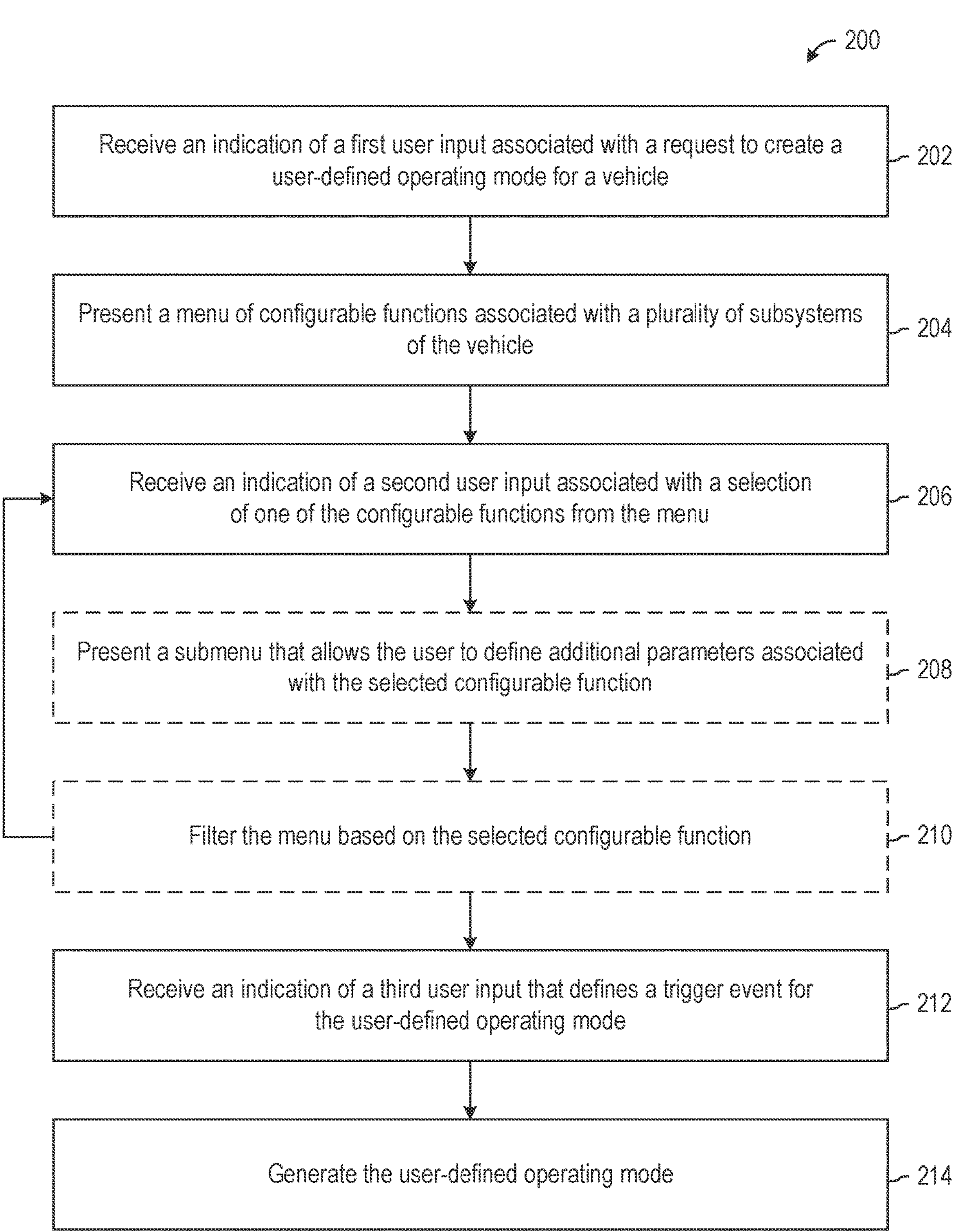
FIG. 2 is a flow chart of a process for creating a user-defined operating mode for a vehicle, according to some implementations.

Referring now to FIG. 2, a flow chart of a process 200 for creating a user-defined operating mode is shown, according to some implementations. As described herein, process 200 can be implemented by control system 100, as described above, or more specifically by controller 102. For example, certain steps of process 200 may be implemented via HMI 142, as discussed above. However, it should be appreciated that process 200, or portions thereof, may be performed by a computing device that is external to vehicle 150. For example, in some implementations, process 200 may be at least partially implemented via a personal computing device (e.g., remote device 148, a smartphone) of a user, such as the owner or operator of vehicle 150. It should also be appreciated that certain steps of process 200 may be optional and, in some implementations, process 200 may be implemented using less than all of the steps. It should be understood that the order of steps shown in FIG. 2 is not intended to be limiting.

Figures 4A, 4B:
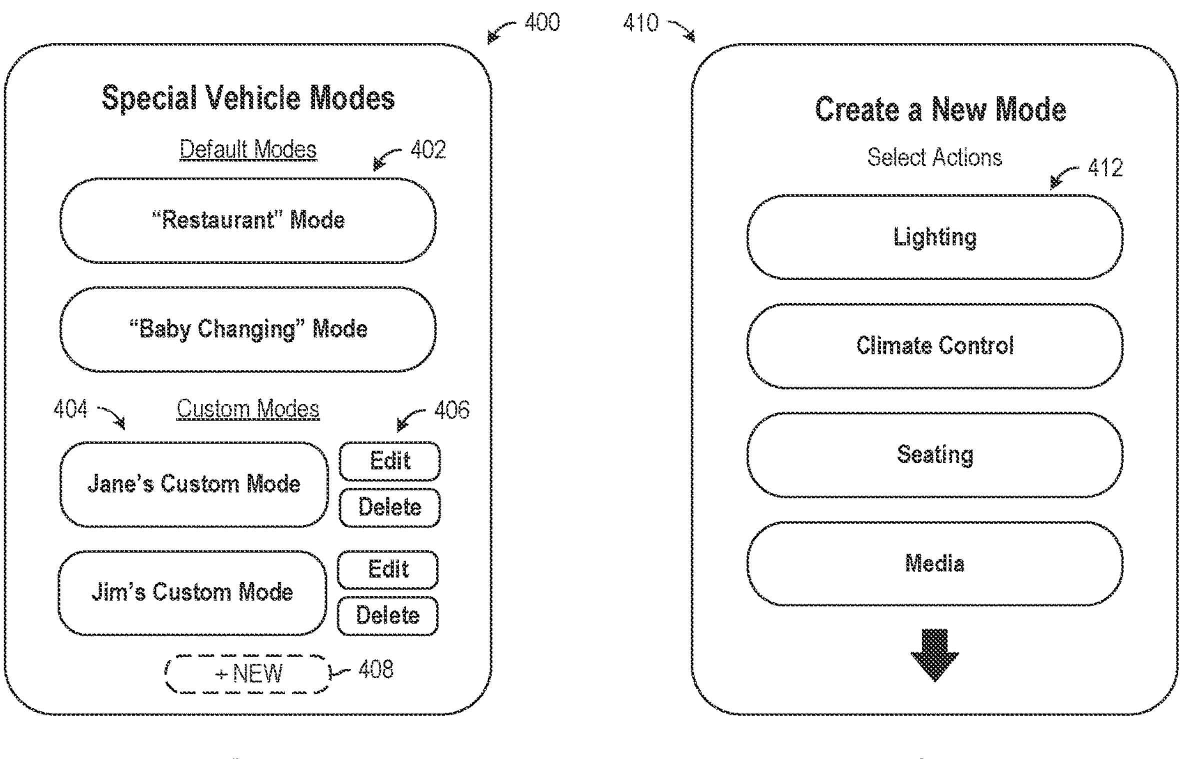
FIGS. 4A-4H are various example graphical user interfaces (GUIs) relating to the creation and use of user-defined operating modes for a vehicle, according to some implementations.

At step 202, an indication of a first user input associated with a request to create a user-defined operating mode for a vehicle (e.g., vehicle 150) is received. As mentioned above, the first user input may be provided by a user via HMI 142 (e.g., a touchscreen display of vehicle 150, such as an infotainment unit) or, in implementations where the user-defined operating mode is being created on a device separate from vehicle 150, via a user interface of the remote device (e.g., a smartphone). For example, the user may be presented via a GUI that facilitates the creation of a user-defined operating mode (e.g., as shown in FIG. 4A) and may select a graphical element of the GUI (e.g., a button) to initiate the creation of the user-defined operating mode.

Figures 4C, 4D:
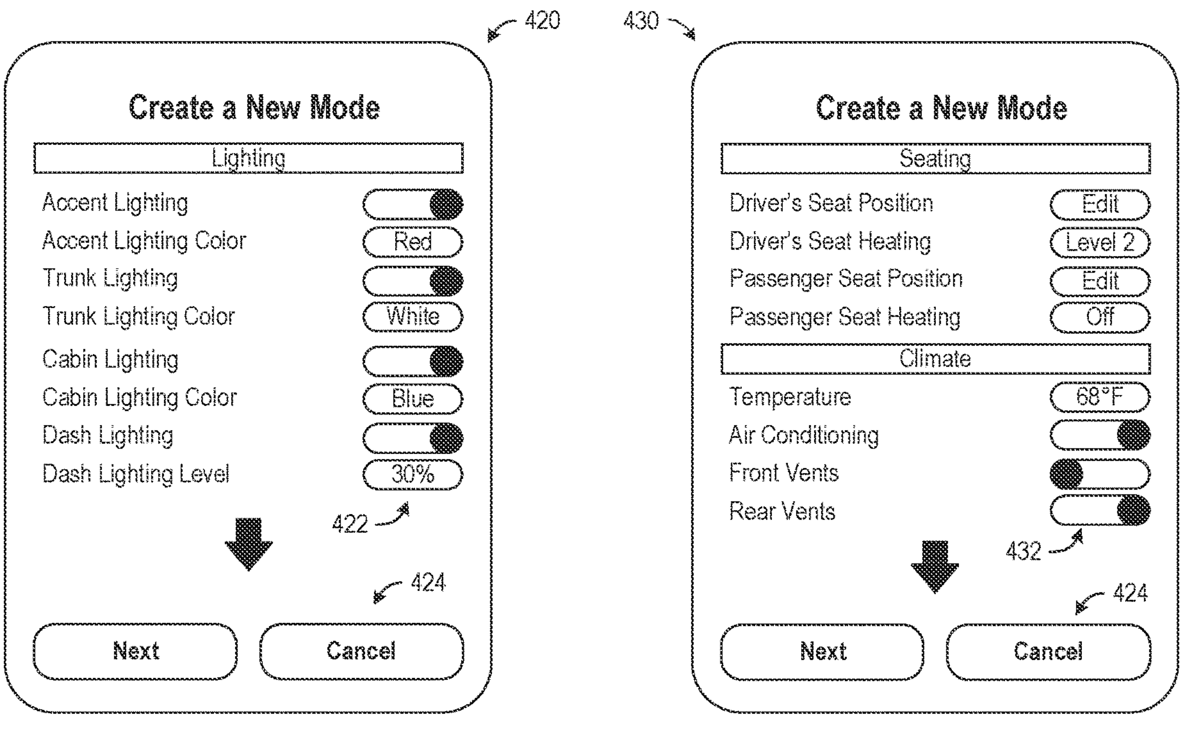

At step 204, a menu of configurable functions associated with the systems of the vehicle is presented. As discussed at length above, configurable functions can include any function of vehicle 150 or the systems thereof that can be selectively activated and/or otherwise controlled in a user-defined operating mode. In other words, as also discussed above, each of the configurable functions may be associated with at least one of an operating parameter or an executable action of at least one system of vehicle 150. The menu of configurable functions may, accordingly, include a list of configurable functions that are available to the user, e.g., presented in a GUI via HMI 142 and/or remote device 148. Example GUIs illustrating menus of configurable functions are shown in FIGS. 4B-4D.

At step 206, an indication of a second user input associated with a selection of a configurable function from the menu is received. As mentioned above, the second user input may be provided by a user via HMI 142 (e.g., a touchscreen display of vehicle 150, such as an infotainment unit) or, in implementations where the user-defined operating mode is being created on a device separate from vehicle 150, via a user interface of the remote device (e.g., a smartphone). For example, the user may tap or touch one of the configurable functions presented in the menu, e.g., at step 204, in order to include the associated action and/or to configure a corresponding parameter/setting in the user-defined operating mode. Example GUIs which illustrate different techniques for selecting a configurable function are shown in FIGS. 4C-4D.

As discussed at length above, it should be understood that "selecting" a configurable function can have multiple meanings. In some implementations, a configurable function can be "selected" by merely activating/deactivating the configurable function or otherwise choosing to include the configurable function in the user-defined operating mode. For example, a configurable function relating to activating the air conditioning in climate control system 124 could be selectable as "on" or "off," or even simply as "on" (e.g., where "off" is a default setting). In some implementations, a configurable function can be "selected" by entering or selecting an operating parameter, condition, or setting associated with the configurable function. For example, continuing the discussion of climate control system 124, a temperature setting for the interior of vehicle 150 could be a configurable function, where the user would enter the temperature setting as an act of "selecting" the configurable function. It should be appreciated, in this regard, that the present disclosure is not intended to be limiting as to how configurable functions are "selected" or defined.

At step 208, a submenu that allows the user to define additional parameters associated with the selected configurable function is optionally presented. In some implementations, the submenu is presented via an additional GUI responsive to user selection of one of the configurable functions at step 206, e.g., as in the example GUI of FIG. 4C. This "submenu" may be presented, for example, responsive to a user selection of a configurable function that requires additional parameters to be implemented. For example, again continuing the discussion of climate control system 124 from above, selecting a configurable function for "air conditioning (AC) on" may cause a submenu associated with climate control system 124 to be presented, e.g., to prompt the user to enter additional parameters such as a temperature setpoint and/or to define which vents/zones within vehicle 150 the air-conditioned air should be provided through.

At step 210, the menu of configurable functions is optionally filtered based on the selected configurable function. In particular, a subset of all of the possible or remaining configurable functions (e.g., as presented in the menu at step 204) may be identified responsive to the indication of the second user input, e.g., based on the configurable function selected by the user. In some implementations, the subset of configurable functions is determined based on rules associated with the selected configurable function, e.g., which dictate which other configurable function(s) can be used with the selected configurable function and/or which dictate operating parameters of vehicle 150 that may limit which other configurable functions can be used cooperatively with the selected configurable function. In some implementations, filtering the menu based on the user selection can include generating and/or presenting an additional GUI that includes a filtered version of the menu indicating only the subset of the configurable functions, e.g., such that the user cannot choose any additional configurable functions that are not part of the subset of configurable functions.

For example, say the first configurable function selected by the user is associated with an action of locking a differential of powertrain 132. It may be established, e.g., via predefined rules, that the action of locking the differential of powertrain 132 can only be performed when vehicle 150 is stationary (e.g., to prevent damage to the differential). Accordingly, the user's initial selection of this configurable function may cause the menu of configurable functions to be filtered such that any configurable functions that require vehicle 150 to be in motion are no longer displayed to the user, and therefore cannot be selected.

It should be appreciated that the subset of configurable functions could alternatively or additionally be determined by evaluating whether a selected configurable function contradicts a previously selected configurable function (e.g., when steps 206-210 are repeated, as discussed below). For example, if the user first selects a configurable function associated with opening a front trunk or "frunk" of vehicle 150, then the menu of configurable functions may be filtered to remove the option to close the "frunk," since it would be a contradiction to include both functions in the same user-defined operating mode.

As discussed herein, it should be appreciated that steps 206-210 of process 200 may be repeated indefinitely, such that a user can select as many configurable functions as they'd like to include in their user-defined operating mode. For example, steps 206-210 may be performed only once if the user chooses to include just one configurable function in their user-defined operating mode, or multiple times if the user chooses to include multiple configurable functions. The above-mentioned "baby changing mode," for example, could require steps 206-210 to be repeated up to or more than four times, with one repetition corresponding to each selection/definition of setting a rear hatch of the vehicle to open, setting a tailgate to drop down into an "open" position, setting climate control system 124 of the vehicle to activate rear vents, and programming the interior lights at the rear of the vehicle to remain on.

Figures 4E, 4F:
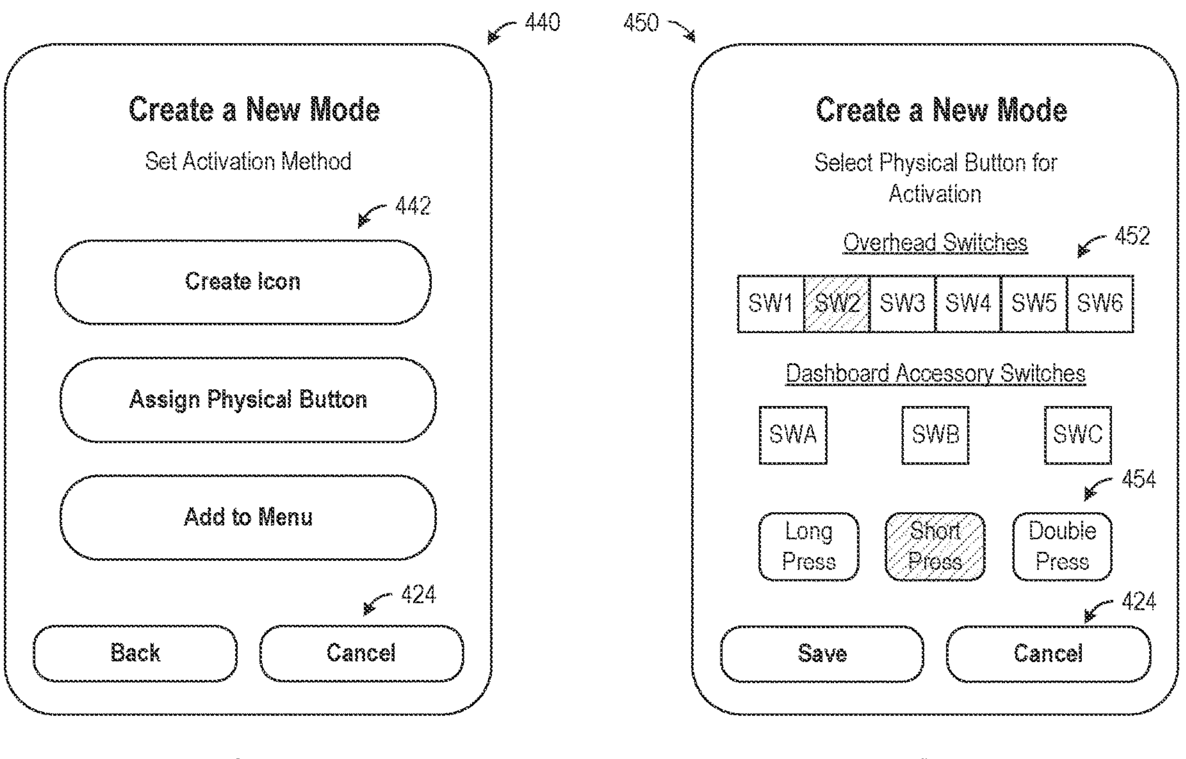

At step 212, an indication of a third user input that defines a trigger event for the user-defined operating mode is received. As with the first and second user inputs discussed above, the third user input may be provided by a user via HMI 142 (e.g., a touchscreen display of vehicle 150, such as an infotainment unit) or, in implementations where the user-defined operating mode is being created on a device separate from vehicle 150, via a user interface of the remote device (e.g., a smartphone). For example, the user may tap or touch one of a number of predefined trigger events, e.g., presented via GUI, in order to include the associated action and/or to configure a corresponding parameter/setting in the user-defined operating mode. Example GUIs which illustrate different techniques for setting the trigger event are shown in FIGS. 4E-4F. Alternatively, the trigger event could be established by another technique.

As discussed above, trigger events for user-defined operating modes can vary. In some implementations, a trigger event is associated with the detection of at least one of a user input to a touchscreen user interface of vehicle 150 (e.g., a selection of the user-defined operating mode from a menu) or manipulation of a physical input device of vehicle 150. In some such implementations, the function of the physical input device in connection with the trigger event is assigned based on the third user input. However, in other implementations, various other trigger events can be used. For example, the trigger event could be a voice command or the detection of certain conditions, e.g., using the sensors and/or systems of vehicle 150. In one such example, location-based trigger events could be established such that the user-defined operating mode is activated if vehicle 150 is at or near a particular location.

At step 214, the user-defined operating mode is generated. As described above, generating the user-defined operating mode can include creating a routine of actions, steps, and/or settings that is performed when the user-defined operating mode is activated, e.g., based on the selected configurable functions. In some such implementations, the user-defined operating mode can be stored, e.g., within a database and/or on a memory of controller 102, for later use during operations of vehicle 150. In some implementations, generating user-defined operating mode includes generating an icon associated with user-defined operating mode, e.g., for display via HMI 142.

Using Custom Operating Modes

Figure 3:
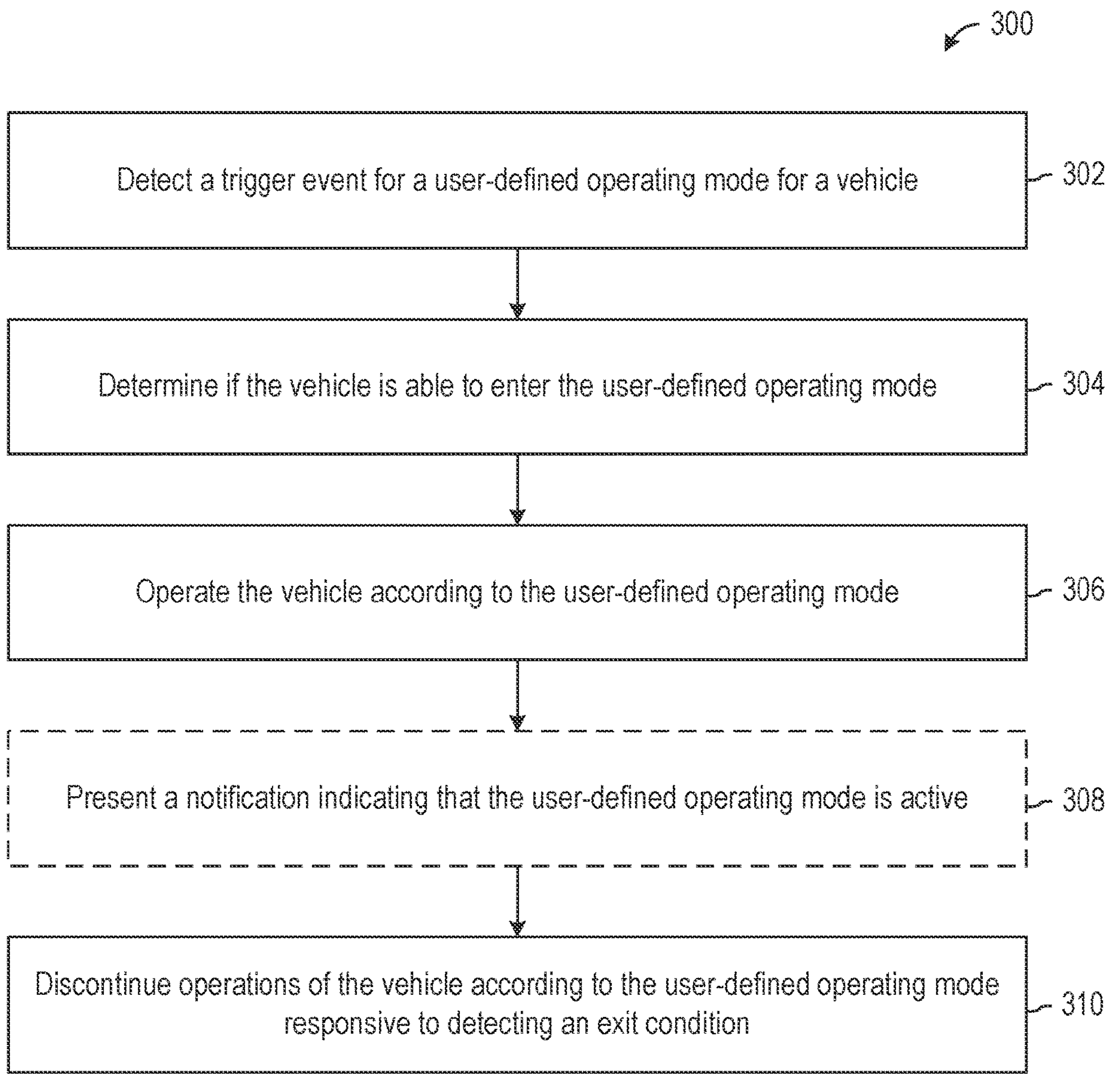
FIG. 3 is a flow chart of a process for operating a vehicle according to a user-defined operating mode, according to some implementations.

Referring now to FIG. 3, a flow chart of a process 300 for using a user-defined operating mode (e.g., to operate vehicle 150) is shown, according to some implementations. As described herein, process 300 can be implemented by control system 100, as described above, or more specifically by controller 102. For example, certain steps of process 300 may be implemented via HMI 142, as discussed above. With reference to the discussion above, it should be understood that process 300 may be implemented following the creation of a user-defined operating mode via process 200. It should be appreciated that certain steps of process 300 may be optional and, in some implementations, process 300 may be implemented using less than all of the steps. It should be understood that the order of steps shown in FIG. 3 is not intended to be limiting.

At step 302, the trigger event for a user-defined operating mode is detected. As described above, any sort of trigger event may be established for a user-defined operating mode, e.g., during creation of the user-defined operating mode. In some implementations, for example, the trigger event includes detection of a user input to HMI 142 (e.g., a touchscreen user interface) of vehicle 150 and/or manipulation of a physical input device (e.g., input devices 146) of vehicle 150. Other trigger events could include, but are not limited to, a location-based trigger event, an operator-based trigger event, detection of a particular accessory or component being installed onto vehicle 150, detection of a particular user device within a threshold distance of vehicle 150, and so on. A location-based trigger event, for example, may mean that the user-defined operating mode is activated if a location of vehicle 150 matches some preset location (e.g., a geofence). An operator-based trigger event may mean that the user-defined operating mode if vehicle 150 detects that a particular person is operating vehicle 150 (e.g., using cameras or voice recognition, based on data received from a device carried by the person, etc.).

At step 304, a determination is made as to whether the vehicle can activate the user-defined operating mode. In some implementations, determining whether the user-defined operating mode can be activated includes evaluating a plurality of activation conditions. As discussed above, any sort of activation condition can be established. One such activation condition, for example, could be based on whether vehicle 150 is moving or stationary, where certain user-defined operating modes are not able to be activated with vehicle 150 is moving (e.g., the user-defined operating modes that include opening a door, raising/lowering suspension, etc.). In some implementations, the determination of whether activation condition(s) are met—or, in other words, whether the user-defined operating mode is able to be activated—is based on data from the various systems of vehicle 150. For example, in some implementations, the data obtained from the various systems of vehicle 150 can include an indication of a current operating mode or current operating parameters of each system, fault conditions associated with any of systems, and/or sensor data from any of the systems. Based on this information, controller 102 can make a decision as to whether the activation conditions are met.

At step 306, the vehicle (e.g., vehicle 150) is operated according to the user-defined operating mode. Generally, this can include controlling the various systems and components of vehicle 150 based on the user-selected configurable functions associated with the user-defined operating mode. For example, controller 102 may transmit control signals to individual systems and/or components of control system 100 and/or may transmit operating instructions to various additional control devices of vehicle 150 (e.g., a BCM, an SCM, etc.). In turn, the individual systems and/or components may operate according to the user-defined operating mode, e.g., by performing a certain action associated with one of the user-selected configurable functions and/or by adjusting an operating parameter based on one of the user-selected configurable functions.

Figures 4G, 4H:
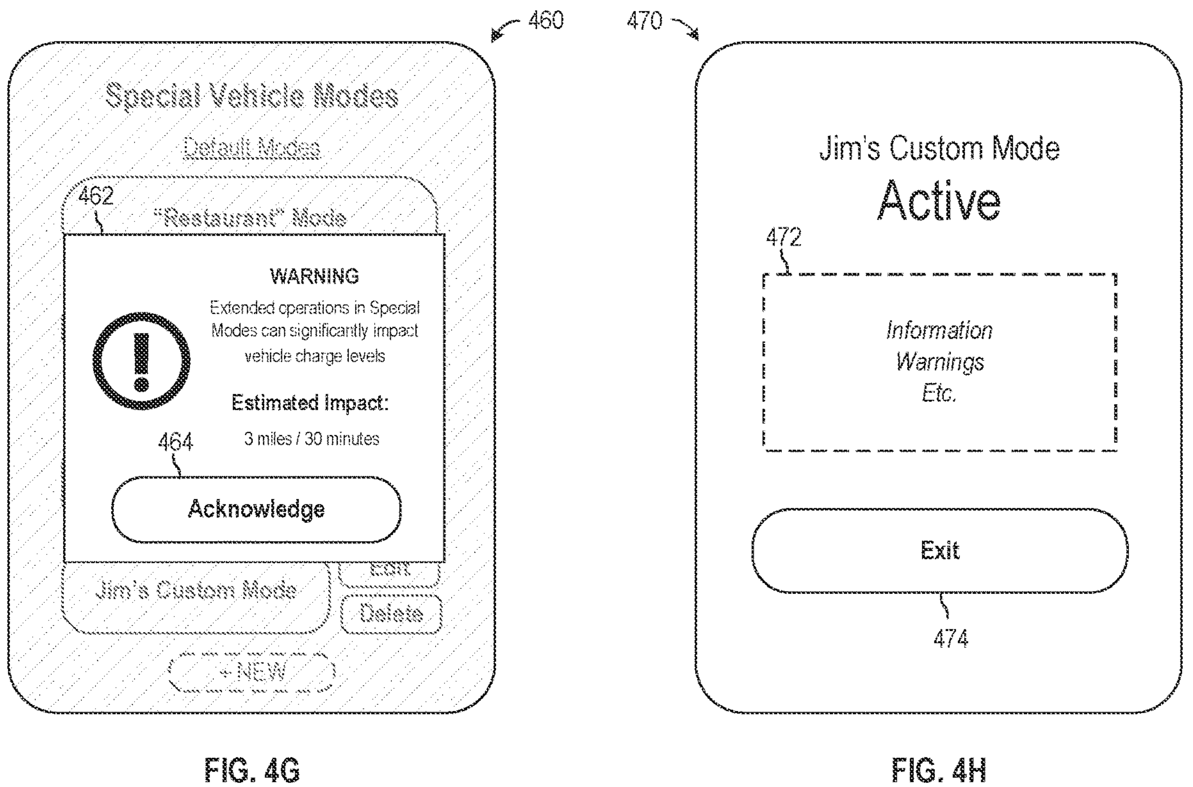

At step 308, a notification indicating that the user-defined operating mode is active is optionally presented. In some implementations, the notification is presented as a GUI indicating that vehicle 150 is operating in the user-defined operating mode in response to detecting the trigger event. In some such implementations, the GUI may include information associated with the operations of vehicle 150 and/or the user-defined operating mode, such as sensor data, warnings or alerts, etc. As an example, the GUI indication that the user-defined operating mode is active may indicate a current state-of-charge of the battery of vehicle 150 and/or may indicate an effect on charge level due to operating in the user-defined operating mode. An example of such a notification is shown in FIG. 4H.

At step 310, operations of the vehicle according to the user-defined operating mode are discontinued responsive to the detection of an exit condition. Similar to the above-mentioned activation conditions, any sort of exit condition(s) can be established. In some implementations, an exit condition may include an indication of a user input associated with either a request to exit the user-defined operating mode or a request to activate a different operating mode. In some implementations, an exit condition could include a determination that a rule associated with at least one of the configurable functions of the user-defined operating mode is broken, e.g., based on real-time operating parameters of vehicle 150. For example, the exit condition may be associated with a determination that vehicle 150 is moving or that vehicle 150 has been place into "drive" while in a non-driving user-defined operating mode, in which case the user-defined operating mode may be deactivated to prevent damage and/or unsafe operations.

It should be noted that, in some implementations, operating vehicle 150 according to a user-defined operating mode is a relatively short process, in that it may only take a few moments to adjust settings and/or operating parameters of vehicle 150. For example, a user-defined operating mode that only includes adjustments to the seats of vehicle 150 is not necessarily continuously active; rather, activating the user-defined operating mode may only be considered "active" momentarily, e.g., while the position of the seats is being adjusted. In other implementations, user-defined operating modes are continuously "active," e.g., until an exit condition is met. For example, the above-mentioned "baby-changing mode" may remain active until it is cancelled by a user.

Example GUIs

Referring now to FIGS. 4A-4H, various example GUIs for the creation and use of user-defined operating modes are shown. As discussed above, any of these example GUIs may be displayed via an HMI of a vehicle (e.g., HMI 142) and/or via a computing device that is remote from the vehicle (e.g., remote device 148). In one example, the GUIs shown in FIGS. 4A-4H are presented via a central display device (e.g., an "infotainment" or "head" unit, as discussed above) within vehicle 150; however, the present disclosure is not intended to be limiting in this regard.

Turning first to FIG. 4A, in particular, an example GUI 400 that includes a menu of selectable operating modes is shown. In this example, GUI 400 is specifically shown to include a list 402 of "default" operating modes, which may refer to a number of preset or pre-generated vehicle operating modes. As discussed above, a preset or pre-generated vehicle operating mode may refer to an operating mode that is created by a manufacturer of vehicle 150, e.g., as opposed to a user. As shown, list 402 includes a "restaurant" mode and a "baby-changing" mode. GUI 400 is also shown to include a list 404 of user-defined operating modes or "custom" modes (e.g., a "Jane's Custom Mode" and a "Jim's Custom Mode," in this example). With reference to the discussion above, list 404 may be updated to list additional user-defined operating modes as they are created.

As shown, any of the entries in list 402 and list 404 may be selectable icons or other graphical elements. Accordingly, a user may select any of the operating modes shown in list 402 or list 404 via an input to a user interface. For example, if GUI 400 is displayed via HMI 142, then an input may be a touch on a touchscreen display, e.g., selecting one of the operating modes for activation. However, as discussed above, other techniques for activating an operating mode (e.g., by voice command) are contemplated herein. With regards to list 404, GUI 400 is shown to include additional selectable icons 406 that can be selected to edit and/or delete a user-defined operating mode. For example, if a user selects the "edit" icon next to one of the user-defined operating modes, they may be presented via a different GUI for changing details of the user-defined operating mode (e.g., changing the configurable functions). GUI 400 may also include a selectable icon 408 or other graphical element that, when selected by a user, initiates the creation of a new user-defined operating mode.

FIG. 4B shows an example GUI 410 for creating a new user-defined operating mode. With respect to the discussion above, GUI 410 may be an example of the GUI that is presented when a user selects selectable icon 408 from GUI 400, or when a user selects an "edit" icon from selectable icons 406. As shown, GUI 410 includes a menu 412 of configurable functions, e.g., presented in the form of selectable icons or other graphic elements. In this example, menu 412 includes "lighting," "climate control," seating", "media," and more icons that are not shown. It will be appreciated that each of the items in menu 412 generally relates to one system of control system 100 and/or otherwise generalizes a functionality of vehicle 150. In this manner, a user may select one of the icons in menu 412 to be presented with a separate GUI for selecting/configuring configurable functions associated with the selected category. For example, "lighting" may encompass a variety of configurable functions relating to lighting system 122; therefore, a user selection of the "lighting" icon may cause a separate GUI to be presented that lists configurable functions of lighting system 122.

FIG. 4C shows an example of the type of GUI that may be presented when a user selects one of the icons from menu 412, e.g., shown as GUI 420. In this example, the user has selected "lighting" menu 412 and is therefore presented via a list of configurable functions associated with lighting system 122. Via GUI 420, the user may therefore select the configurable functions they want to include in their user-defined operating mode and/or may enter parameters for select configurable functions. In this example, configurable functions are selected/configured via selection elements 422. Generally, selection elements 422 are graphical elements that can be manipulated by a user input, e.g., to affect an associated configurable function. For example, in FIG. 4C, selection elements 422 are shown as a combination of toggle switches (e.g., switchable between “off” and “on”) and data entry boxes, which reflect a setting of the associated configurable function.

To select a configurable function to include in a user-defined operating mode, for example, a user may toggle the selection element associated with the configurable function to “on.” In this example, each of “accent lighting,” “trunk lighting,” “cabin lighting,” and “dash lighting” are toggled to “on,” meaning that the user has selected for the accent, trunk, cabin, and dash lights to be turned on when their user-defined operating mode is active. For configurable functions that require a setting or operating parameter, instead of a simple on/off selection, the user may select the corresponding selection element and enter some parameter. It should be appreciated that the method by which the user enters a parameter may vary. For example, the user may be presented with a menu of options associated with the selected configurable function or may be able to enter text. In GUI 410, for example, the user may have selected the “accent lighting color” from a menu of available colors. However, the “dash lighting level” setting may have been selected by entering text, manipulating a slider, etc.

FIG. 4D shows an alternative to GUI 410 and GUI 420—presented as GUI 430—which can be presented when a user chooses to create or edit a user-defined operating mode. In other words, GUI 430 may be presented in lieu of GUI 410 and GUI 420. As shown, GUI 430 directly presents all of the configurable functions available to a user, e.g., instead of presenting only a subset of configurable functions associated with a selected category. However, GUI 430 is otherwise similar to GUI 420 in that a list of configurable functions is presented, along with corresponding selection elements 432 for selecting/deselecting and/or otherwise configuring select configurable functions.

As shown, each of FIGS. 4C and 4D can include navigation buttons 424 for navigating through the various user-defined operating mode creation GUIs. For example, navigation buttons 424 are shown to include a “next” button, which a user may select to move onto a subsequent GUI, and a “cancel” button, which the user may select to cancel the creation of the user-defined operating mode. In some implementations, selecting the “next” button causes one of the example GUIs of FIG. 4E or 4F to be presented, e.g., continuing the creation of the user-defined operating mode. However, selecting the “cancel” button may cause the creation of the user-defined operating mode to be stopped and the user to be returned to one of GUI 400 or GUI 410.

FIG. 4E shows an example GUI 440 for setting an activation method or “trigger event” for a user-defined operating mode. As shown, GUI 440 includes selectable icons 442 for a number of different trigger events, including “create an icon,” “assign a physical button,” and “add to menu.” Selecting one of selectable icons 442 causes the corresponding trigger event to be assigned to the user-defined operating mode. For example, if the user selects “add to menu,” then the user-defined operating mode may be added to list 404 in GUI 400, as described above. It should also be appreciated that, while not shown, GUI 440 or one of the other GUIs shown in FIGS. 4A-4E may allow a user to define/set a name for their user-defined operating mode. As with GUI 420 and GUI 430, GUI 440 can include navigation buttons 424; however, in some implementations, the “next” button may be replaced with a “back” button to allow the user to return to a previous GUI (e.g., GUI 420 or GUI 430).

FIG. 4F shows an example GUI 450 which may be presented when a user selects the “assign a physical button” icon from GUI 440. GUI 450 therefore may provide an indication of available physical buttons and switches within vehicle 150 (e.g., part of HMI 142) that can be used to activate their user-defined operating mode. For example, GUI 450 is shown to include a menu 452 of overhead accessory switches, e.g., which are positioned above an operator’s head within vehicle 150, and dashboard switches, any of which can be assigned to the user-defined operating mode. In this specific example, the user is shown to have selected overhead accessory switch “SW2,” such that when “SW2” is manipulated, the user-defined operating mode is activated.

In some implementations, GUI 450 can also include a submenu 454 indicating different input parameters for the selected button/switch. In this manner, each of the physical buttons/switches in vehicle 150 could potentially be used to activate multiple user-defined operating modes, e.g., based on the way that the button/switch is manipulated. For example, in GUI 450, it is shown that the user could further choose one of a “long press,” a “short press,” or a “double press” to activate their user-defined operating mode. If the user selects the “short press” option, e.g., as in FIG. 4F, then a short press of SW2 would cause the user-defined operating mode to be activated. However, the user could assign another user-defined operating mode to be activated with a double-press of SW2. Similarly, it should be appreciated that the user could select a combination of switches/buttons to activate a user-defined operating mode. For example, the user could select both SW1 and SW2, such that both switches would need to be manipulated to activate the corresponding user-defined operating mode.

As discussed at length above, once one or more user-defined operating modes are created, they may be activated via GUI 400 and/or via manipulation of a physical button or switch within vehicle 150. Responsive to activation of a user-defined operating mode, in some implementations, a notification or alert may be presented to the user, e.g., informing the user of relevant information for the user-defined operating mode. FIG. 4G shows an example GUI 460 that includes a notification 462 presented over the menu of GUI 400. This notification, in particular, warns the operator of vehicle 150 that extended operations in their selected user-defined operating mode may significantly impact a charge level of power supply 134 (e.g., a battery); therefore, the operator should take caution to not deplete power supply 134 while in the user-defined operating mode. In this example, notification 462 further provides an indication of the estimated range impact from operating in the user-defined operating mode.

It should be appreciated, however, that notification 462 may indicate any sort of information to a user. For example, instead of warning the user about battery usage, notification 462 could indicate safety concerns (e.g., “this operating mode can only be used when vehicle 150 is stationary”). Regardless of the information presented, in some implementations, notification 462 can further include a button 464 that registers the user’s acknowledgement of the notification or warning. For example, button 464 may need to be selected by the user before the user-defined operating mode is activated, to record that the user acknowledged the risk/limitations associated with the user-defined operating mode. In another example, where the user-defined operating mode cannot be activated for some reason (e.g., the user selects a “station-only” mode while vehicle 150 is moving), button 464 may instead reflect the user’s acknowledgement that the user-defined operating mode cannot be activated.

FIG. 4H shows an example GUI 470 that can be displayed when a user-defined operating mode is active. For example, GUI 470 could be displayed on a central infotainment display of vehicle 150. As shown, GUI 470 may indicate a name or label for the user-defined operating mode and may also indicate that the user-defined operating mode is active. In some implementations, GUI 470 may include a graphical element 472 that provides additional information relating to the user-defined operating mode. For example, graphical element 472 may present warnings or alerts that do not necessarily prevent vehicle 150 from operating in the user-defined operating mode. In one such example, graphical element 472 may display a remaining charge level of power supply 134 and/or may indicate a real-time impact on the charge level due to the user-defined operating mode. Graphical element 472 could also display current data (e.g., operating parameters) for various systems of 150, such as sensor data obtained from any of the sensors included in vehicle 150. In another example, graphical element 472 could include fault conditions associated with any of the systems of vehicle 150. In some implementations, GUI 470 can also include an "exit" button 474 that can be selected by a user to exit or deactivate the user-defined operating mode.

Configuration of Certain Implementations

The construction and arrangement of the systems and methods as shown in the various implementations are illustrative only. Although only a few implementations have been described in detail in this disclosure, many modifications are possible (e.g., variations in sizes, dimensions, structures, shapes, and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions, and arrangement of the implementations without departing from the scope of the present disclosure.

The present disclosure contemplates methods, systems, and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor.

When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

It is to be understood that the methods and systems are not limited to specific synthetic methods, specific components, or to particular compositions. It is also to be understood that the terminology used herein is for the purpose of describing particular implementations only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another implementation includes from the one particular value and/or to the other particular value. Similarly, when values are expressed as approximations, by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal implementation. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific implementation or combination of implementations of the disclosed methods.

What is claimed is:

1. A controller for a vehicle, the controller comprising:

at least one processor; and memory having instructions stored thereon that, when executed by the at least one processor, cause the controller to:

present a first graphical user interface (GUI) that includes a menu of configurable functions associated with a plurality of subsystems of the vehicle that are selectable by a user to generate a user-defined operating mode, wherein each of the configurable functions is associated with at least one of an operating parameter or an executable action of one of the plurality of subsystems;

receive an indication of at least one first user input associated with a selection of one or more of the configurable functions from the menu;

receive an indication of a second user input defining a trigger event for the user-defined operating mode;

determine if the vehicle is able to be operated according to the user-defined operating mode, and if the vehicle is able to be operated according to the user-defined operating mode, then generate the user-defined operating mode based on the at least one first user input and the second user input; and control the one or more of the plurality of subsystems of the vehicle associated with the selection of the one or more of the configurable functions to operate according to the user-defined operating mode in response to detecting the trigger event;

else if the vehicle is not able to be operated according to the user-defined operating mode, then preventing the user from selecting a combination of the selected at least one first user input and the selected one of the second user input for the user-defined operating mode.

2. The controller of claim 1, wherein the instructions further cause the controller to:

receive an indication of a third user input associated with a request to create the user-defined operating mode, wherein the first GUI is presented responsive to receiving the indication of the third user input.

3. The controller of claim 1, wherein the instructions further cause the controller to:

determine a subset of the configurable functions responsive to the at least one user input, wherein the subset of the configurable functions is determined based on rules associated with a first one of the configurable functions selected by the user; and present a second GUI that includes a filtered version of the menu including the subset of the configurable functions.

4. The controller of claim 1, wherein the instructions further cause the controller to:

present a second GUI responsive to user selection of one of the configurable functions, wherein the second GUI includes a submenu associated with the selected one of the configurable functions for receiving third user inputs that define parameters of the selected one of the configurable functions.

5. The controller of claim 1, wherein the instructions further cause the controller to:

present a second GUI indicating that the vehicle is operating in the user-defined operating mode in response to detecting the trigger event.

6. The controller of claim 1, wherein the trigger event includes detection of at least one of: (i) a third user input to a touchscreen user interface of the vehicle, or (ii) manipulation of a physical input device of the vehicle, wherein a function of the physical input device in connection with the trigger event is assigned based on the second user input.

7. The controller of claim 1, wherein determining if the vehicle is able to be operated according to the user-defined operating mode comprises:

determining if the vehicle is able to be operated according to the user-defined operating mode based on data from the one or more of the plurality of subsystems, wherein the data comprises at least one of:

an indication of a current operating mode or current operating parameters of the one or more of the plurality of subsystems, fault conditions associated with any of the one or more of the plurality of subsystems, or sensor data from the one or more of the plurality of subsystems.

8. The controller of claim 1, wherein the instructions further cause the controller to:

discontinue operations of the one or more of the plurality of subsystems of the vehicle associated with the selection of the one or more of the configurable functions according to the user-defined operating mode responsive to a determination that an exit condition has been met, wherein the exit condition comprises at least one of:

an indication of a third user input associated with one of a request to exit the user-defined operating mode or a request to activate a second operating mode that is different from the user-defined operating mode, or a determination that a rule associated with at least one of the configurable functions of the user-defined operating mode is broken based on real operating parameters of the vehicle.

9. The controller of claim 1, wherein the first GUI is presented via a user interface of the vehicle, and wherein the indication of the at least one first user input and the indication of the second user input are received via the user interface of the vehicle.

10. A method of controlling a vehicle according to a user-defined operating mode, the method comprising:

presenting a first graphical user interface (GUI) that includes a menu of configurable functions for a plurality of subsystems of the vehicle, wherein each of the configurable functions is associated with at least one of an operating parameter or an executable action of one of the plurality of subsystems;

receiving an indication of at least one first user input associated with a selection of one or more of the configurable functions from the menu;

receiving an indication of a second user input defining a trigger event for the user-defined operating mode;

determining if the vehicle is able to be operated according to the user-defined operating mode, and if the vehicle is able to be operated according to the user-defined operating mode, then generating the user-defined operating mode based on the at least one first user input and the second user input; and causing the one or more of the plurality of subsystems of the vehicle associated with the selection of the one or more of the configurable functions to operate according to the user-defined operating mode in response to detecting the trigger event;

else if the vehicle is not able to be operated according to the user-defined operating mode, then preventing selecting a combination of the selected at least one first user input and the selected one of the second user input for the user-defined operating mode.

11. The method of claim 10, wherein causing the one or more of the plurality of subsystems of the vehicle associated with the selection of the one or more of the configurable functions to operate according to the user-defined operating mode comprises transmitting control signals to the one or more of the plurality of subsystems associated with the selection of the one or more of the configurable functions by a first computing device of the vehicle.

12. The method of claim 10, further comprising:

receiving an indication of a third user input associated with a request to create the user-defined operating mode, wherein the first GUI is presented responsive to receiving the indication of the third user input.

13. The method of claim 10, further comprising:

determining a subset of the configurable functions responsive to the at least one user input, wherein the subset of the configurable functions is determined based on rules associated with a first one of the configurable functions selected by a user; and presenting a second GUI that includes a filtered version of the menu including the subset of the configurable functions.

14. The method of claim 10, further comprising:

presenting a second GUI responsive to user selection of one of the configurable functions, wherein the second GUI includes a submenu associated with the selected one of the configurable functions for receiving third user inputs that define parameters of the selected one of the configurable functions.

15. The method of claim 10, further comprising:

causing a user interface of the vehicle to display a second GUI indicating that the vehicle is operating in the user-defined operating mode in response to the determination that the trigger event is met.

16. The method of claim 10, wherein the trigger event comprises detection of at least one of: (i) a third user input to a touchscreen user interface of the vehicle, or (ii) manipulation of a physical input device of the vehicle, wherein a function of the physical input device in connection with the trigger event is assigned based on the second user input.

17. The method of claim 10, wherein determining if the vehicle is able to be operated according to the user-defined operating mode comprises:

determining if the vehicle is able to be operated according to the user-defined operating mode based on data from the one or more of the plurality of subsystems, wherein the data comprises at least one of:

an indication of a current operating mode or current operating parameters of the one or more of the plurality of subsystems, fault conditions associated with any of the one or more of the plurality of subsystems, or sensor data from the one or more of the plurality of subsystems.

18. The method of claim 10, further comprising:

causing the one or more of the plurality of subsystems of the vehicle associated with the selection of the one or more of the configurable functions to discontinue operations according to the user-defined operating mode responsive to a determination that an exit condition has been met, wherein the exit condition comprises at least one of:

an indication of a third user input associated with one of a request to exit the user-defined operating mode or a request to activate a second operating mode that is different from the user-defined operating mode, or a determination that a rule associated with at least one of the configurable functions of the user-defined operating mode is broken based on real operating parameters of the vehicle.

19. The method of claim 10, wherein the first GUI is presented via a user interface of the vehicle, and wherein the indication of the at least one first user input and the indication of the second user input are received via the user interface of the vehicle.

20. A vehicle comprising:

a plurality of vehicle systems, including at least an interior lighting system, a climate control system, a seating adjustment system, and an infotainment system; and a controller configured to control the plurality of vehicle systems according to any of a plurality of operating modes, including a user-defined operating mode, wherein when the user-defined operating mode is active, the controller is configured to:

present, via a user interface device of the infotainment system, a first graphical user interface (GUI) that includes a menu of configurable functions for the plurality of vehicle systems, wherein each of the configurable functions is associated with at least one of an operating parameter or an executable action of one of the plurality of vehicle systems;

receive, via the user interface device, at least one first user input associated with a selection of one or more of the configurable functions from the menu;

receive, via the user interface device, a second user input defining a trigger event for the user-defined operating mode; and determine if the vehicle is able to be operated according to the user-defined operating mode, and if the vehicle is able to be operated according to the user-defined operating mode, then generate the user-defined operating mode based on the at least one first user input and the second user input; and control the one or more of the plurality of subsystems of the vehicle associated with the selection of the one or more of the configurable functions according to the user-defined operating mode in response to detecting the trigger event;

else if the vehicle is not able to be operated according to the user-defined operating mode, then preventing selecting a combination of the selected at least one first user input and the selected one of the second user input for the user-defined operating mode.

* * * * *